(12) United States Patent
Yamashita et al.

(10) Patent No.: US 10,705,822 B2
(45) Date of Patent: Jul. 7, 2020

(54) TERMINAL DEVICE AND SOFTWARE REWRITING PROGRAM

(71) Applicant: Yanmar Co., Ltd., Osaka-shi, Osaka-fu (JP)

(72) Inventors: Shunzo Yamashita, Osaka (JP); Shintaro Ishimoto, Osaka (JP); Masaki Matsuo, Osaka (JP); Yusuke Kojima, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 16/081,358

(22) PCT Filed: Feb. 20, 2017

(86) PCT No.: PCT/JP2017/006066
§ 371 (c)(1),
(2) Date: Aug. 30, 2018

(87) PCT Pub. No.: WO2017/150235
PCT Pub. Date: Sep. 8, 2017

(65) Prior Publication Data
US 2019/0026098 A1 Jan. 24, 2019

(30) Foreign Application Priority Data
Mar. 1, 2016 (JP) .................. 2016-038927

(51) Int. Cl.
*G06F 9/44* (2018.01)
*G06F 8/65* (2018.01)
(Continued)

(52) U.S. Cl.
CPC ............. *G06F 8/65* (2013.01); *G06F 8/311* (2013.01); *H04L 67/34* (2013.01); *H04W 4/80* (2018.02); *H04W 8/22* (2013.01); *H04W 84/12* (2013.01)

(58) Field of Classification Search
None
See application file for complete search history.

(56) References Cited

U.S. PATENT DOCUMENTS

| 2015/0012913 A1 | 1/2015 | Jin et al. | |
| 2015/0178067 A1* | 6/2015 | Ji ........................... | G06F 8/65 717/170 |
| 2015/0230044 A1* | 8/2015 | Paun ........................ | G06F 8/65 455/41.2 |

FOREIGN PATENT DOCUMENTS

| JP | 2006-178896 A | 7/2006 |
| JP | 2009-123226 A | 6/2009 |

(Continued)

OTHER PUBLICATIONS

European Search Report dated Feb. 13, 2019 in corresponding EP Application No. 17759702.8 cites the patent documents above.
(Continued)

*Primary Examiner* — Qamrun Nahar
(74) *Attorney, Agent, or Firm* — Norton Rose Fulbright US LLP

(57) ABSTRACT

A terminal device for use in a software rewriting system configured to rewrite a software package of a control device mounted on a movable object, including: a wide area communication unit configured to communicate with a server via a wide area network; a storage unit; and a short-range wireless communication unit configured to communicate with the movable object via a short-range wireless communication network. The updating software package is received, via the wide area network and the wide area communication unit, from a server including an updating software database storing the updating software packages for updating the software package of the control device. The updating software package received from the server is stored in the storage unit. The updating software package stored in (Continued)

the storage unit is transmitted to the movable object, via the short-range wireless communication unit and a short-range wireless communication network.

20 Claims, 16 Drawing Sheets

(51) Int. Cl.
*H04W 4/80* (2018.01)
*G06F 8/30* (2018.01)
*H04L 29/08* (2006.01)
*H04W 8/22* (2009.01)
*H04W 84/12* (2009.01)

(56) References Cited

FOREIGN PATENT DOCUMENTS

| | | |
|---|---|---|
| JP | 2011-044014 A | 3/2011 |
| JP | 2015-018295 A | 1/2015 |
| JP | 2015-230709 A | 12/2015 |

OTHER PUBLICATIONS

International Search Report dated May 23, 2017 issued in corresponding PCT Application PCT/JP2017/006066 cites the patent documents above.

* cited by examiner

FIG. 5

| MT | MI | MC | CC | | WFWC | VR | RI | DB2 YMDA | 133 |
|---|---|---|---|---|---|---|---|---|---|
| | MODEL INFORMATION OF MOVABLE OBJECT | | CONTROL DEVICE CODE | | UPDATING SOFTWARE CODE | | UPDATE INFORMATION | | |
| TYPE OF MOVABLE OBJECT | MODEL CODE | | | | | VERSION | DATE AND TIME | | |
| COMBINE HARVESTER | WRK1 | | WRK1ECU1 | | WRK1ECU1FW1 | 1.0 | 2015/1/20 12:00 | | |
| | | | | | WRK1ECU1FW2 | 1.1 | 2015/6/1 13:00 | | |
| | | | | | WRK1ECU1FW3 | 1.2 | 2015/11/5 11:00 | | |
| | | | WRK1ECU2 | | WRK1ECU2FW1 | 1.0 | 2014/3/15 12:00 | | |
| | | | | | WRK1ECU2FW2 | 1.1 | 2014/7/21 14:00 | | |
| | WRK2 | | WRK2ECU1 | | WRK2ECU1FW1 | 1.0 | 2013/12/25 10:00 | | |
| | | | WRK2ECU2 | | WRK2ECU2FW1 | 1.1 | 2014/2/10 9:00 | | |
| | ⋮ | | ⋮ | | ⋮ | ⋮ | ⋮ | | |
| PLEASURE BOAT | BT1 | | BT1ECU1 | | BT1ECU1FW1 | 1.0 | 2015/6/1 16:00 | | |
| | | | | | BT1ECU1FW2 | 1.1 | 2015/9/15 12:00 | | |
| | | | BT1ECU2 | | BT1ECU2FW1 | 1.0 | 2014/4/11 14:00 | | |
| | | | | | BT1ECU2FW2 | 1.1 | 2014/7/1 15:00 | | |
| | | | | | BT1ECU2FW3 | 1.2 | 2015/1/10 16:00 | | |
| | BT2 | | BT2ECU1 | | BT2ECU1FW1 | 1.0 | 2015/4/22 18:00 | | |
| | ⋮ | | ⋮ | | ⋮ | ⋮ | ⋮ | | |
| ⋮ | | | | | | | | | |

FIG. 6

| UPDATING SOFTWARE CODE (WFWC) | UPDATING SOFTWARE PACKAGE (WFW) |
|---|---|
| WRK1ECU1FW1 | WRK1ECU1FW1.WFW |
| WRK1ECU1FW2 | WRK1ECU1FW2.WFW |
| WRK1ECU1FW3 | WRK1ECU1FW3.WFW |
| WRK1ECU2FW1 | WRK1ECU2FW1.WFW |
| WRK1ECU2FW2 | WRK1ECU2FW2.WFW |
| ... | ... |
| WRK2ECU1FW1 | WRK2ECU1FW1.WFW |
| WRK2ECU2FW1 | WRK2ECU2FW1.WFW |
| ... | ... |
| ... | ... |
| BT1ECU1FW1 | BT1ECU1FW1.WFW |
| BT1ECU1FW2 | BT1ECU1FW2.WFW |
| BT1ECU2FW1 | BT1ECU2FW1.WFW |
| BT1ECU2FW2 | BT1ECU2FW2.WFW |
| BT1ECU2FW3 | BT1ECU2FW3.WFW |
| ... | ... |
| BT2ECU1FW1 | BT2ECU1FW1.WFW |
| ... | ... |
| ... | ... |

| AR | MT | DB1 / MI | MC |
|---|---|---|---|
| AREA INFORMATION | MODEL INFORMATION OF MOVABLE OBJECT | | |
| | TYPE OF MOVABLE OBJECT | MODEL CODE | |
| A1 | COMBINE HARVESTER | WRK1 | |
| | | WRK2 | |
| | | ... | |
| | ... | | |
| A2 | COMBINE HARVESTER | WRK2 | |
| | | ... | |
| | ... | | |
| A3 | COMBINE HARVESTER | WRK1 | |
| | | ... | |
| | ... | | |
| A4 | PLEASURE BOAT | BT1 | |
| | | ... | |
| | ... | | |
| A5 | PLEASURE BOAT | BT1 | |
| | | BT2 | |
| | | ... | |
| | ... | | |
| A6 | PLEASURE BOAT | BT2 | |
| | | ... | |
| ... | ... | | |

|  | DB4 |  |
|---|---|---|
| ID |  | AR |
| TERMINAL IDENTIFICATION INFORMATION | AREA INFORMATION | |
| #1111 | A1 | |
| #2222 | A3 | |
| #3333 | A5 | |
| #4444 | A2 | |
| #5555 | A6 | |
| #6666 | A1 | |
| #7777 | A4 | |
| #8888 | A3 | |
| #9999 | A1 | |
| ... | ... | |

133

TERMINAL DEVICE AND SOFTWARE REWRITING PROGRAM

CROSS REFERENCES TO RELATED APPLICATIONS

This application is a national stage application pursuant to 35 U.S.C. § 371 of International Application No. PCT/JP2017/006066, filed on Feb. 20, 2017, which claims priority under 35 U.S.C. § 119 to Japanese Patent Application No. 2016-038927, filed on Mar. 1, 2016, the disclosures of which are hereby incorporated by reference in their entireties.

TECHNICAL FIELD

The present invention relates to a terminal device and a software rewriting program for use in a software rewriting system configured to rewrite a software package of a control device mounted in a movable object such as work machine or a ship.

BACKGROUND ART

As a software rewriting system configured to rewrite a software package of a control device mounted to a movable object, for example, there is a system in which a terminal device in a movable object receives an updating software package for updating the software package in a control device from a server via a wide area network and the software package in the control device mounted in the movable object is rewritten based on the updating software package received (see Patent Literature 1, hereinafter PTL 1).

More specifically, in the software rewriting system described in PTL 1, a communication unit (terminal device) provided in a vehicle (movable object) receives a rewriting program (updating software package) from a software management center (server) via a telephone network and the like. Based on this rewriting program received, a program in the control device mounted in the vehicle is rewritten.

CITATION LIST

Patent Literature

PTL 1: Japanese Patent Application Laid-Open No. 2011-44014

SUMMARY OF INVENTION

Technical Problem

As described, in areas with a sufficiently well-developed communication infrastructure, a software package of a control device can be reliably rewritten by such a software rewriting system which rewrites a software package of a control device mounted in a movable object by using an updating software package received from a server via a wide area network.

However, it is not necessarily true that any area has sufficiently well-developed communication infrastructure, and there are areas with underdeveloped communication infrastructure. For example, there are areas where there is no communication infrastructure, and even if there is communication infrastructure, communication cost could be high, communication speed could be low, or communication could be unstable.

In these areas with underdeveloped communication infrastructure, it may not be possible to reliably rewrite a software package of a control device.

In view of the above, it is an object of the present invention to provide a terminal device for use in a software rewriting system configured to rewrite a software package of a control device mounted in a movable object and software rewriting program, which can reliably rewrite a software package of a control device mounted on a movable object, even in an area with underdeveloped communication infrastructure.

Solution to Problem

To achieve the above object, an aspect of the present invention provides a terminal device and software rewriting program as described below.

(1) Terminal Device

A terminal device related to an aspect of the present invention is a terminal device for use in a software rewriting system configured to rewrite one or more software packages of one or more control devices mounted on one or more movable objects, the terminal device including: a wide area communication unit configured to communicate, via a wide area network, with a server having an updating software database storing one or more updating software packages for updating the one or more software packages of the one or more control devices; a storage unit; and a short-range wireless communication unit configured to communicate with the one or more movable objects via a short-range wireless communication network. The one or more updating software packages in the updating software database are received from the server via the wide area network and the wide area communication unit. The one or more updating software packages received from the server are stored in the storage unit. At least one of the one or more updating software packages stored in the storage unit is transmitted to at least one of the one or more movable objects via the short-range wireless communication unit and the short-range wireless communication network.

(2) Software Rewriting Program

A software rewriting program related to an aspect of the present invention is a software rewriting program of a terminal device for use in a software rewriting system configured to rewrite a software package of a control device mounted on a movable object. The terminal device comprises a wide area communication unit configured to communicate, via a wide area network, with a server having an updating software database storing an updating software package for updating the software package of the control device, a storage unit; a short-range wireless communication unit configured to communicate with the movable object via a short-range wireless communication network; and a computer. The software rewriting program is configured to cause the computer to execute steps including: a reception control step of receiving an updating software package in the updating software database from the server via the wide area network and the wide area communication unit; a storage control step of storing the updating software package received from the server in the storage unit; and a transmission control step of transmitting the updating software package stored in the storage unit to the movable object via the short-range wireless communication unit and the short-range wireless communication network.

It should be noted that the server is a concept encompassing not only a large information device (e.g. stationary computer installed in a predetermined location) but also information devices capable of storing the updating software database, e.g., a small information device having a storage unit with a sufficient capacity for the data size needed for the updating software database, more specifically, a dedicated terminal device provided to the movable object, a portable general-use terminal device.

The terminal device related to the present invention may be such that the updating software database stores the one or more updating software packages associated with one or more pieces of model information of the one or more movable objects; the one or more pieces of model information and the one or more updating software packages associated with the one or more pieces of model information in the updating software database are received from the server via the wide area network and the wide area communication unit; the one or more pieces of model information and the one or more updating software packages associated with the pieces of model information received from the server are stored in the storage unit; at least one piece of model information of at least one movable object on at least one other end is specified from the one or more pieces of model information stored in the storage unit; and at least one updating software package corresponding to the at least one pieces of model information of the at least one movable object on the at least one other end, out of the one or more updating software packages stored in the storage unit, is transmitted to the at least one movable object on the at least one other end via the short-range wireless communication unit and the short-range wireless communication network.

The terminal device related to the present invention may be such that the updating software database stores, in association with terminal identification information of the terminal device, one or more pieces of area information indicative of one or more control areas of the one or more movable objects; at least one of the one or more pieces of model information corresponding to at least one of the one or more pieces of area information associated with the terminal identification information of the terminal device and at least one of the one or more updating software packages associated with the at least one of the one or more pieces of model information in the updating software database are received from the server via the wide area network and the wide area communication unit; and the at least one of the one or more pieces of model information corresponding to the at least one of the one or more pieces of area information and the at least one of the one or more updating software packages associated with the at least one of the one or more pieces of model information received from the server are stored in the storage unit.

The terminal device related to the present invention may be such that the updating software database stores one or more pieces of update information of the one or more updating software packages, the one or more updating software packages and the one or more pieces of update information of the one or more updating software packages in the updating software database are received from the server via the wide area network and the wide area communication unit, and the one or more updating software packages and the one or more pieces of update information of the one or more updating software packages received from the server are stored in the storage unit.

The terminal device related to the present invention may be such that the terminal device if provided in the one or more movable objects; the short-range wireless communication unit is configured to communicate with at least one other of the one or more movable objects apart from the one of the one or more movable objects via the short-range wireless communication network, and at least one of the one or more updating software packages stored in the storage unit is transmitted to the at least one other of the one or more movable objects via the short-range wireless communication unit and the short-range wireless communication network.

The terminal device related to the present invention may be such that the terminal device functions as a multi-function portable communication terminal device; the short-range wireless communication unit is configured to communicate with the one or more movable objects via the short-range wireless communication network, and at least one of the one or more updating software packages stored in the storage unit is transmitted to the at least one of the one or more movable objects via the short-range wireless communication unit and the short-range wireless communication network.

Advantageous Effects of Invention

With the present invention, a software package of a control device mounted on a movable object can be reliably rewritten even in an area with under developed communication infrastructure.

BRIEF DESCRIPTION OF DRAWINGS

FIG. 5 is a schematic view showing an exemplary data structure of an updating software management database in the storage unit provided to the server.

FIG. 6 is a schematic view showing an exemplary data structure of the updating software storage database in the storage unit provided to the server.

FIG. 8 is a schematic view showing an exemplary data structure with area information added in the model information management database shown in FIG. 4.

FIG. 9 is a schematic view showing an exemplary data structure of the area information management database constituting the updating software database in the storage unit provided to the server.

DESCRIPTION OF EMBODIMENTS

The following describes embodiments related to the present invention with reference to attached drawings. The following description deals with examples where the movable object is an agricultural work machine such as a combine harvester, a tiller, a rice transplanter, and the like.

First Embodiment

Figure 1:
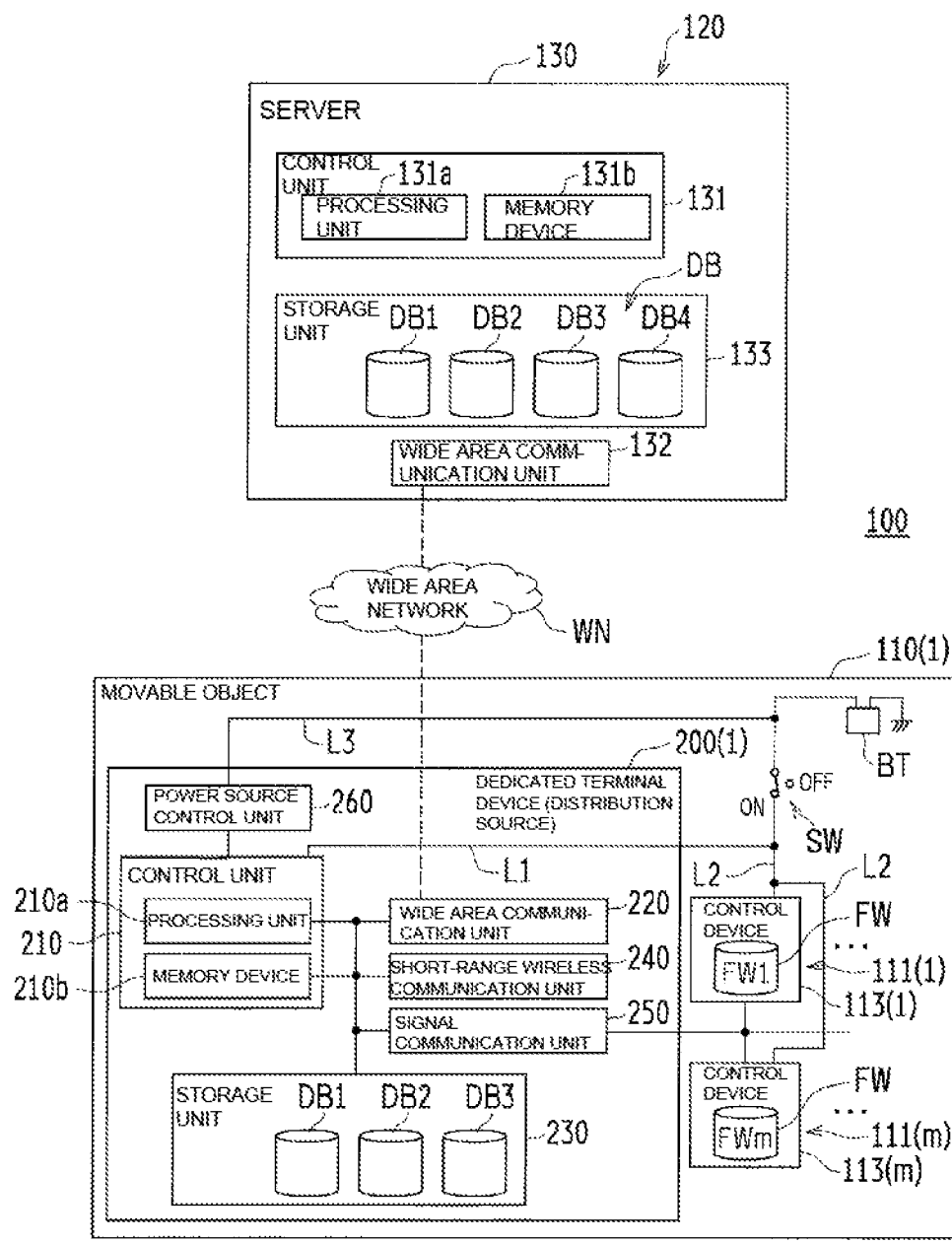
FIG. 1 is a structural diagram schematically showing an exemplary software rewriting system related to a first embodiment, and provides a schematic view of a state where a dedicated terminal device provided to a movable object out of a plurality of movable objects which could serve as a distribution source is communicating with a server via a wide area network.
Figure 2:
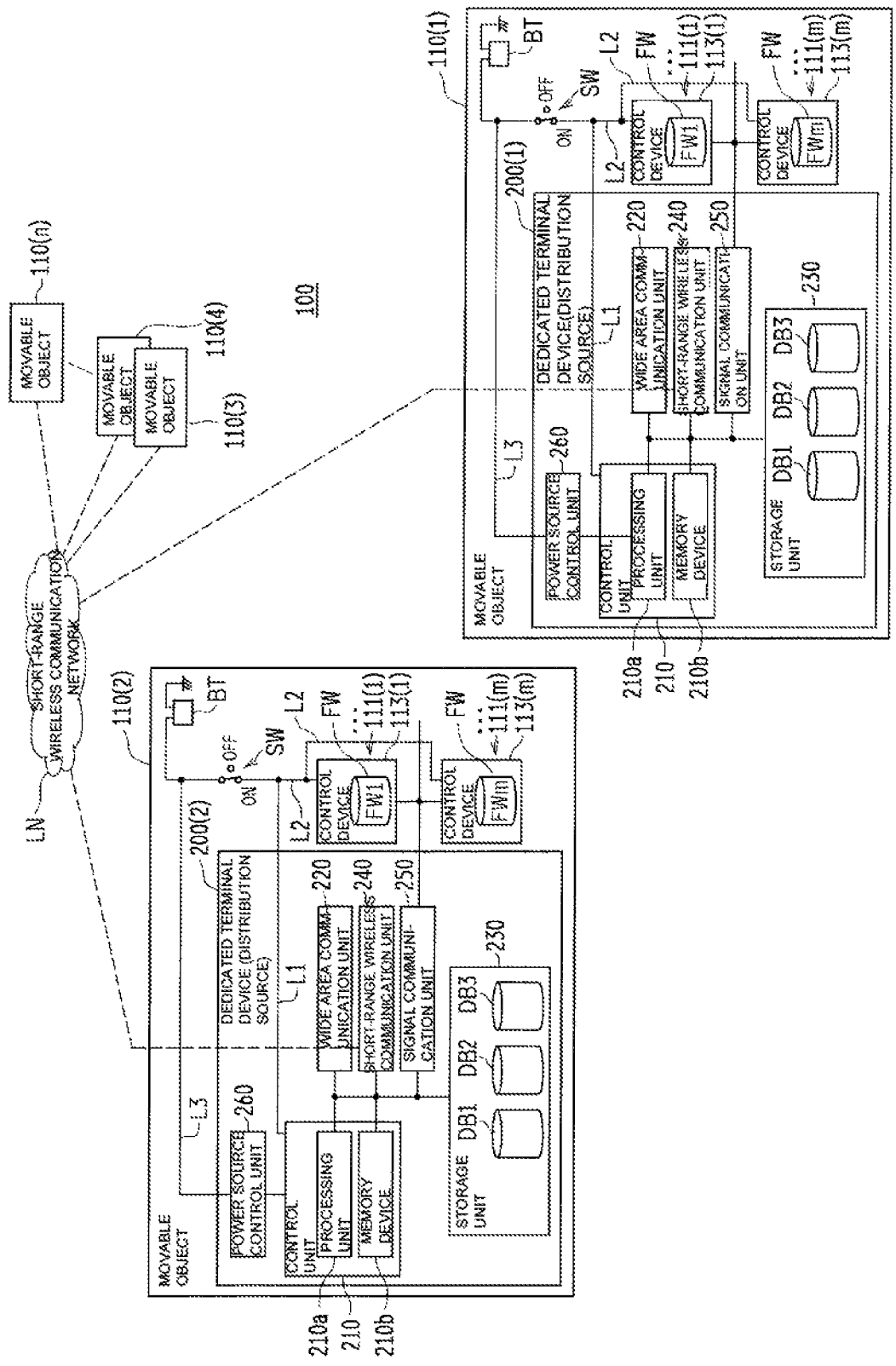
FIG. 2 is a schematic view showing a state where the dedicated terminal device having communicated with the server is communicating, via the short-range wireless communication network, with another dedicated terminal device that could serve as a distribution source, in the software rewriting system shown in FIG. 1.
Figure 3:
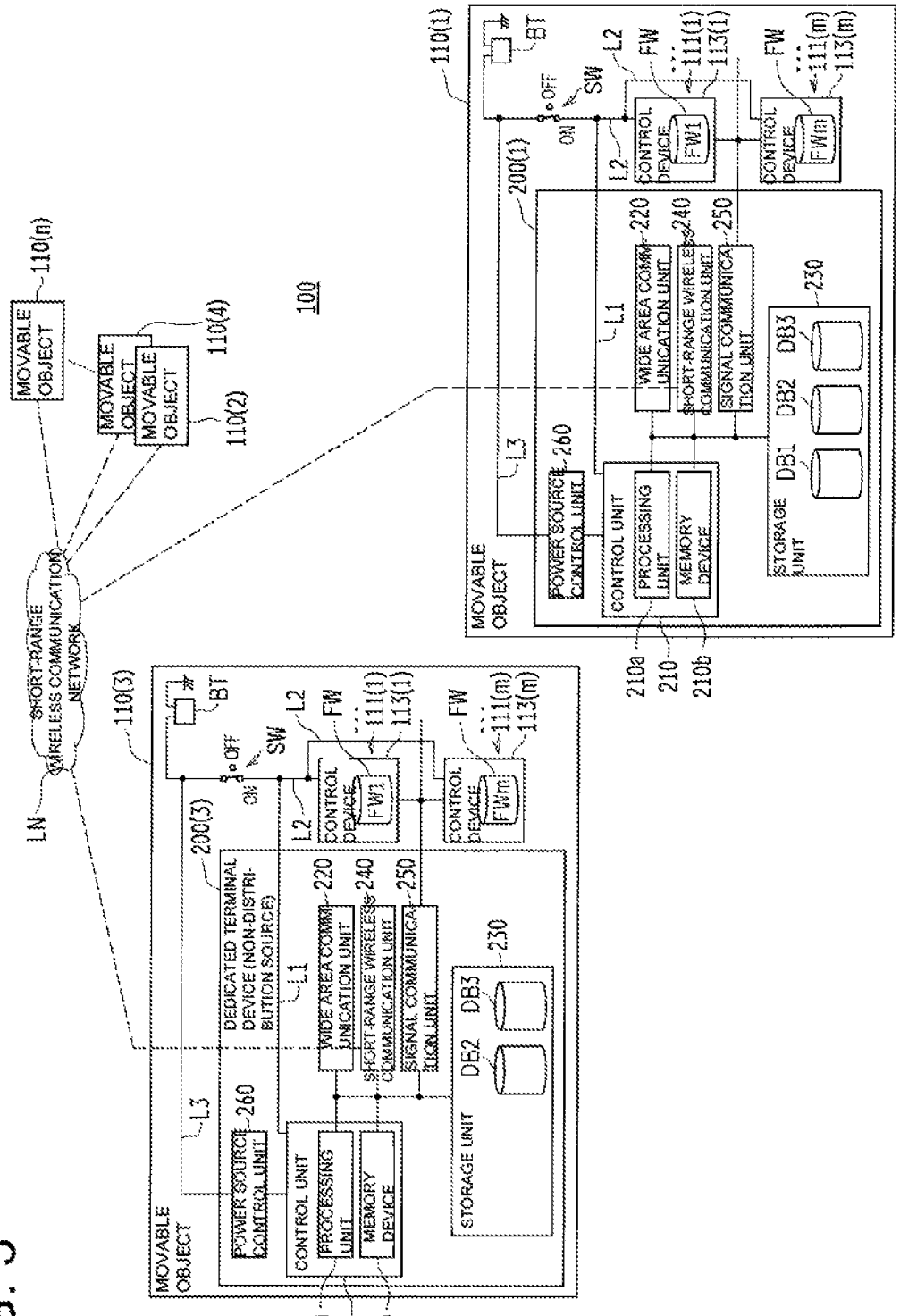
FIG. 3 is a schematic view showing a state where the dedicated terminal device having communicated with the server is communicating, via the short-range wireless communication network, with another dedicated terminal device that does not substantially serve as a distribution source, in the software rewriting system shown in FIG. 1.

FIG. 1 to FIG. 3 are structural view schematically showing an exemplary software rewriting system 100 related to a first embodiment.

FIG. 1 is a schematic view showing a state where a dedicated terminal device 200(1) provided to a movable object 110(1) that could serve as a distribution source, out of a plurality of movable objects 110(1) to 110(n) (where n is an integer of 2 or more), is communicating with a server 130 via a wide area network WN. FIG. 2 is a schematic view showing a state where the dedicated terminal device 200(1) having communicated with the server 130 is communicating, via a short-range wireless communication network LN, with another dedicated terminal device 200 (2) that could serve as a distribution source, in the software rewriting system 100 shown in FIG. 1. FIG. 3 is a schematic view showing a state where the dedicated terminal device 200 (1) having communicated with the server 130 is communicating, via the short-range wireless communication network LN, with another dedicated terminal device 200 (3) that does not substantially serve as a distribution source, in the software rewriting system 100 shown in FIG. 1.

Figure 4:
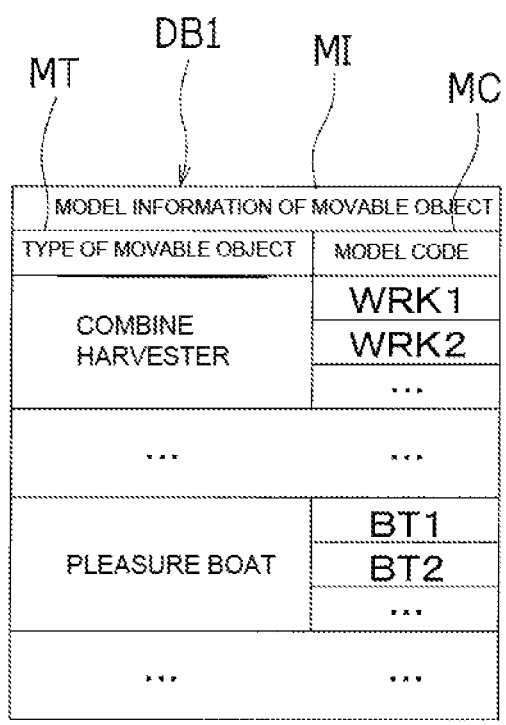
FIG. 4 is a schematic view showing an exemplary data structure of a model information management database in the storage unit provided to the server.

Further, FIG. 4 is a schematic view showing an exemplary data structure of a model information management database DB1 constituting an updating software database DB in the storage unit 133 provided to the server 130. Further, FIG. 5 is a schematic view showing an exemplary data structure of an updating software management database DB2 constituting the updating software database DB in the storage unit 133 provided to the server 130. Further, FIG. 6 is a schematic view showing an exemplary data structure of an updating software storing database DB3 constituting the updating software database DB in the storage unit 133 provided to the server 130.

The software rewriting system 100 shown in FIG. 1 to FIG. 3 is a system for rewriting software packages FW (FW1 to FWm) of control devices 113(1) to 113(m) (where m is an integer of 1 or 2 or more) mounted in a plurality of movable objects 110(1) to 110(n) (e.g., movable work machines, ships) (see FIG. 1 to FIG. 3). In this example, each control device [113(1) to 113(m)] is an electronic control unit (Electronic Control Units: ECU), and the software package FW is firmware.

The software rewriting system 100 includes: the plurality of movable objects 110(1) to 110(n), the dedicated terminal devices 200(1) to 200(n) provided to the plurality of movable objects 110(1) to 110(n), and the server 130 (see FIG. 1) connected to the dedicated terminal devices 200(1) to 200(n) via a wide area network WN (see FIG. 1).

In this example, the server 130 is a large information device (specifically stationary computer installed in a predetermined location). However, the server 130 is not limited to this, and may be information devices capable of storing the updating software database DB, e.g., a small information device having a storage unit with a sufficient capacity for the data size needed for the updating software database DB, more specifically, dedicated terminal devices 200(1) and 200(2) provided to the movable objects 110(1), 110(2), portable general-use terminal devices 300.

The terminal devices 200(1) to (n) include at least one terminal device that could serve as a distribution source for other terminal devices. The terminal devices 200(1) to (n) may include a terminal device that does not substantially serve as a distribution source for the other terminal devices.

It should be noted that the above expression reading "terminal device that does not substantially serve as a distribution source for the other terminal devices" means that the terminal device is capable of serving as a distribution source, provided that the distribution destination is a movable object of the same model; however is not able to serve as a distribution source if the distribution destination is of a different model; i.e., a terminal device that does not have pieces of model information MI except for its own (except the destination model(s)) and does not have updating software packages WFW (see FIG. 4 to FIG. 6) associated with the pieces of model information MI of the other models.

In the following descriptions, terminal devices 200(1) and 200(2) (distribution sources) are each a terminal device that could serve as a distribution source for the other terminal devices, whereas terminal devices 200(3) to 200(n) (non-distribution sources) are each a terminal device that does not substantially serve as a distribution source for the other terminal devices.

The terminal device 200(1) (distribution source) is capable of serving as a destination of updating software packages WFW distributed from the server 130, for updating the software package FW of the control device [113(1) to 113(m)], and as a distribution source for other terminal devices 200(2) to 200(n). Similarly, the terminal device 200(2) (distribution source) is capable of serving as a destination of updating software packages WFW distributed from the server 130 and as a distribution source for other terminal devices 200(1) and 200(3) to 200(n).

More Specifically, the terminal devices 200(1) and 200(2) (distribution sources) are each configured to receive, via a wide area network WN and the wide area communication unit 220, updating software packages WFW in the updating software database DB (see FIG. 4 to FIG. 6) of the server 130.

The terminal device 200(1) (distribution source) stores in the storage unit 230 thereof updating software packages WFW received from the server 130, and transmits an updating software package WFW stored in the storage unit 230, via its short-range wireless communication unit 240 and a short-range wireless communication network LN, to another terminal device, out of the other terminal devices 200(2) to 200(n), which can be communicated within a range of a short-range wireless communication.

Similarly, the terminal device 200(2) (distribution source) stores in the storage unit 230 thereof updating software packages WFW received from the server 130, and transmits an updating software package WFW stored in the storage unit 230, via its short-range wireless communication unit 240 and a short-range wireless communication network LN, to another terminal device, out of the other terminal devices 200(1) and 200(3) to 200(n), which can be communicated within a short-range wireless communication range.

Further, more specifically, the terminal device 200(1) (distribution source) randomly establishes communication with other terminal devices, out of the other terminal devices 200(2) to 200(n), which can be communicated via the short-range wireless communication unit 240 and the short-range wireless communication network LN within a short-range wireless communication range. The terminal device 200(1) then authenticates the other terminal devices out of the terminal devices 200(2) to 200(n) having established communication, and transmits an updating software package WFW stored in the storage unit 230 of the terminal device 200(1) to a terminal device 200(i) on the other end (where i is an integer ranging from 1 to n, corresponding to suffix of the terminal device on the other end), out of the terminal devices 200(2) to 200(n), which corresponds to a piece of model information MI (see FIG. 4) stored in the storage unit 230 of the terminal device 200(1) (distribution source).

Similarly, the terminal device 200(2) (distribution source) randomly establishes communication with other terminal devices, out of the other terminal devices 200(1) and 200(3) to 200(n), which can be communicated via the short-range wireless communication unit 240 and the short-range wireless communication network LN within a short-range wireless communication range. The terminal device 200(2) then transmits an updating software package WFW stored in the storage unit 230 of the terminal device 200(2) (distribution source) to a terminal device 200(i) on the other end, out of the terminal devices 200(1) and 200(3) to 200(n), which corresponds to a piece of model information MI (see FIG. 4) stored in the storage unit 230 of the terminal device 200(2) (distribution source).

As shown in FIG. 1 to FIG. 3, the server 130 (see FIG. 1) in this example is arranged in a remote monitoring center 120 (see FIG. 1) in a position far apart from the movable objects 110(1) to 110(n) in this example, and is configured to store information related to software packages FW of the control devices 113(1) to 113(m) mounted on the movable objects 110(1) to 110(n).

More specifically, the terminal devices 200(1) to 200(n) and the server 130 have wide area communication units 220 and 132 (specifically, wide area communication interfaces), and are connected with one another by their respective wide area communication units 220 and 132 via a wide area network WN (see FIG. 1), thereby enabling transmission/reception of information amongst the terminal devices 200(1) to 200(n) and the server 130. This way, the server 130 allows the users to remotely monitor the movable objects 110(1) to 110(n) through the remote monitoring center 120. The terminal devices 200(1) to 200(n) in this example are each a remote monitoring terminal device. It should be noted that, depending on the situation, the wide area communication unit 220 does not have to be provided in the terminal devices 200(3) to 200(n).

Further, the server 130 can transmit, to the terminal device [200(1), 200(2)] (distribution source) of the movable object [110(1), 110(2)], information regarding the software packages FW of the control devices 113(1) to 113(m) in the movable objects 110(1) to 110(n). On the other hand, the terminal device [200(1), 200(2)] (distribution source) in the movable object [110(1), 110(2)] can receive, from the server 130, information regarding the software packages FW of the control devices 113(1) to 113(m) in the movable objects 110(1) to 110(n).

It should be noted that the wide area network WN may be a wired communication network, a wireless communication network (wireless communication network in compliance with a so-called mobile communication standard), or a combination of a wired communication network and a wireless communication network. Typically, the wide area network WN is a public line network provided by a telecommunications carrier; e.g., a public line network that allows terminals such as landline telephones and mobile phones to communicate with one another.

The movable objects 110(1) to 110(n) each includes one or a plurality of work units (a plurality of work units in this example) [111(1) to 111(m)] to [111(1) to 111(m)] (see FIG. 1 to FIG. 3); and terminal devices 200(1) to 200(n). For example, where the agricultural work machine is a combine harvester, examples of the work units 111(1) to 111(m) are a traveling work unit, a reaping work unit, a threshing work unit, and the like.

The work units 111(1) to 111(m) are provided with the control devices 113(1) to 113(m), respectively. Each of the control devices 113(1) to 113(m) instructs various actuators (not shown) to suitably control the operational states of the corresponding work unit [111(1) to 111(m)]. The control devices 113(1) to 113(m) are each configured to transfer data to one another based on a communication standard such as a CAN (Controller Area Network) standard or the like.

More specifically, the control devices 113(1) to 113(m) control the operational states of the work units 111(1) to 111(m), based on information (signal) of detection values from various sensors of the work units 111(1) to 111(m) and ON/OFF information of various switches. Further, the control devices 113(1) to 113(m) each determines as needed whether or not an abnormality such as breaking down of the movable object 110 is taking place, and if an abnormality is taking place, generates error information (specifically, an error code) corresponding to that abnormality.

A work unit 111, out of the work units 111(1) to 111(m), which operates an engine (not shown) includes: an engine; a control device 113 configured to monitor the rotational speed and the load condition of the engine and control the entire engine by instructing a suitable injection pressure and an injection timing to the combustion system; an electric power generator (not shown); and a start switch SW, and a battery BT is mounted thereto. Further, the control device 113 configured to control the entire engine controls operation start/stop, and operational states of driving by the engine, in addition to control of the work unit 111 that operates the engine.

It should be noted that, during an operating state of the engine by the work unit 111 operating the engine, the battery BT is suitably charged by electric power supplied from the electric power generator.

The start switch SW is a switch for selectively switching a power-on state and a power-off state. It should be noted that the power-on state is a state in which electric power is supplied from the battery BT to a control unit 210 and the control device [113(1) to 113(m)]. The power-off state is a state in which supply of electric power from the battery BT to a control unit 210 and the control device [113(1) to 113(m)] is shut-off.

More specifically, the battery BT is connected, via the start switch SW, to both a power source connection line L1 connected to the control unit 210 and a power source connection line L2 connected to the control device [113(1) to 113(m)].

In this example, the start switch is a switch so called key switch, and an on-terminal thereof is a connection terminal of the power source connection lines L1 and L2. An off-terminal is a terminal while the start switch SW is in the off state.

It should be noted that the battery BT and a power control unit 260 are connected via a power source connection line L3, irrespective of the ON/OFF state of the start switch SW.

[Server]

As shown in FIG. 1, the server 130 includes a control unit 131, a wide area communication unit 132, and the storage unit 133.

[Control Unit]

The control unit 131 includes: a processing unit 131a constituted by a so-called computer such as a CPU (Central Processing Unit); and a memory unit 131b including a volatile memory such as a ROM (Random Only Memory), a RAM (Random Access Memory).

The control unit 131 is configured to perform operation control of various structuring elements by having the processing unit 131a load a control program stored in advance in the ROM of the memory unit 131b into the RAM of the memory unit 131b, and running the program.

In the present embodiment, the control unit 131 controls transmission/reception of data during communications, various inputs and outputs, and arithmetic processing.

(Wide Area Communication Unit)

The wide area communication unit 132 is electrically connected to a data line of the control unit 131. With instructions from the control unit 131, the wide area communication unit 132 is able to perform communication using the same communication protocol as the wide area communication units 220 (see FIG. 1 to FIG. 3) of the terminal devices 200(1) to 200(n) of the movable objects 110(1) to 110(n). Data transmitted/received during communication is converted by the wide area communication unit 132 so as to comply with the communication protocol. The wide area communication unit 132 transmits information in the storage unit 133, which is related to the software packages FW of the control devices 113(1) to 113(m) in the movable objects 110(1) to 110(n), to the terminal devices 200(1) to 200(n) [terminal devices 200(1) and 200(2) in this example] in the movable objects 110(1) to 110(n) [movable objects 110(1) and 110(2) in this example].

(Storage Unit)

The storage unit 133 is electrically connected to a data line of the control unit 131. With instructions from the control unit 131, the storage unit 133 controls writing and reading of information. The storage unit 133, in this example, is a large-capacity storage unit such as a flush memory, or a hard disk device.

In the storage unit 133, the updating software database DB is stored.

When the type of the movable objects 110(i) on the other end (e.g., movable work machines, ships) are different, it goes without saying that the software packages FW of the control devices 113(1) to 113(m) mounted on the movable objects 110(i) on the other end may be different. Even if the movable objects 110(i) on the other end are the same type, the software packages FW of the control devices 113(1) to 113(m) mounted to the movable objects 110(i) of different models may be different. If the updating software packages WFW stored in the storage unit 230 are not for the software packages FW of the control devices 113(1) to 113(m) mounted to the movable objects 110(i) on the other end, the software packages FW of the control devices 113(1) to 113(m) of the movable objects 110(i) on the other end cannot be rewritten.

In view of the above, the updating software database DB stores updating software packages WFW in association with pieces of model information MI (see FIG. 4 to FIG. 6) of the movable objects 110(1) to 110(n). Further, the updating software database DB stores pieces of update information RI (see FIG. 5) of the updating software packages WFW.

In the present embodiment, the updating software database DB includes: the model information management database DB1 (see FIG. 4); the updating software management database DB2 (see FIG. 5); and the updating software storing database DB3 (see FIG. 6). An area information management database DB4 will be described later.

As shown in FIG. 4, the model information management database DB1 stores pieces of model information MI of the movable objects 110(1) to 110(n).

Specifically, in the model information management database DB1, the types MT of the movable objects 110(1) to 110(n), and model codes MC of the movable objects 110(1) to 110(n) are registered. More specifically, in the model information management database DB1, the movable objects 110(1) to 110(n) of all types MT produced by a manufacturer (e.g., movable work machines, ships), and model codes MC of all models of the movable objects 110(1) to 110(n) are registered.

When a new model is developed, the type MT and the model code MC of the movable object 110 is registered at any time in the model information management database DB1.

As shown in FIG. 5, the updating software management database DB2 stores updating software codes WFWC (updating firmware codes in this example) of the control devices 113(1) to 113(m) (ECU in this example) in the movable objects 110(1) to 110(n).

Specifically, in the updating software management database DB2, the types MT of the movable objects 110(1) to 110(n), the model codes MC of the movable objects 110(1) to 110(n), control device codes CC (ECU symbols and/or a number in this example) of the control devices 113(1) to 113(m), and the updating software codes WFWC associated with pieces of update information RI (version VR and/or date and time YMDT) are registered. More specifically, in the updating software management database DB2, the movable objects 110(1) to 110(n) of all types MT (e.g., movable work machines, ships) produced by a manufacturer, the model codes MC of all models of the movable objects 110(1) to 110(n), the control device codes CC of the control devices 113(1) to 113(m) in the movable objects 110(1) to 110(n), and updating software codes WFWC associated with pieces of update information RI are registered.

When a new model is developed, the type MT, the model code MC, the control device code CC, and the updating software code WFWC associated with a piece of update information RI of the movable object 110 are registered at any time in the updating software management database DB2. When a new version of a software package FW is developed, the piece of update information RI and the updating software code WFWC associated with the piece of update information RI are updated at any time in the updating software management database DB2.

As shown in FIG. 6, the updating software storing database DB3 stores updating software packages WFW.

Specifically, in the updating software storing database DB3, updating software codes WFWC and updating software packages WFW associated with the updating software codes WFWC are registered. More specifically, in the updating software storing database DB3, the movable objects 110(1) to 110(n) of all types MT produced by a manufacturer (e.g., movable work machines, ships), and updating software packages WFW for all models of the movable objects 110(1) to 110(n) are registered.

When a new model or a new version of a software package FW is developed, the updating software code WFWC and the updating software package WFW associated with the updating software code WFWC are registered at any time in the updating software storing database DB3.

Further, in the storage units 230 of the terminal devices 200(1) to 200(n) in the movable objects 110(1) to 110(n), pieces of model information MI and pieces of update information RI such as the versions VR and the like of the software packages FW of the control devices 113(1) to 113(m) are registered.

[Dedicated Terminal Device (Distribution Source)]

Next, a system configuration of the dedicated terminal device [200(1), 200(2)] (distribution source) is described with reference to FIG. 1 to FIG. 3.

—Hardware Configuration of Dedicated Terminal Device (Distribution Source)—

As shown in FIG. 1 to FIG. 3, the terminal devices 200(1) and 200(2) (distribution sources) each includes a control unit 210 (an example of computer), a wide area communication unit 220, a storage unit 230, a short-range wireless communication unit 240, a signal communication unit 250, and a power source control unit 260.

(Control Unit)

The control unit 210 includes: a processing unit 210a constituted by a so-called computer such as a CPU (Central Processing Unit); and a memory unit 210b including a volatile memory such as a ROM (Random Only Memory), a RAM (Random Access Memory).

The control unit 210 is configured to achieve various functions necessary for the control unit 210, by running programs such as software rewriting program PP (see FIG. 7 described later) which is stored (installed) in advance in the storage unit 230. Specifically, the control unit 210 is configured to perform various processes by having a processing unit 210a thereof load a program such as the software rewriting program PP stored in advance in the storage unit 230 into the RAM of the memory device 210b, and running that program. The RAM of the memory device 210b provides a working area to the control unit 210.

In the present embodiment, the control unit 210 controls transmission/reception of data during communications, various inputs and outputs, and arithmetic processing.

(Wide Area Communication Unit)

The wide area communication unit 220 is electrically connected to a data line of the control unit 210. With instructions from the control unit 210, the wide area communication unit 220 is able to perform communication using the same communication protocol as the wide area communication unit 132 (see FIG. 1) of the server 130. Data transmitted/received during communication is converted by the wide area communication unit 220 so as to comply with the communication protocol. Further, the wide area communication unit 220 receives, from the server 130, information regarding software packages FW of the control devices 113(1) to 113(m) in the movable objects 110(1) to 110(n), which information is stored in the storage unit 133 of the server 130.

(Storage Unit)

The storage unit 230 is electrically connected to a data line of the control unit 210. With instructions from the control unit 210, the storage unit 230 controls writing and reading of information. The storage unit 230, in this example, is a large-capacity storage unit such as a flush memory.

The storage unit 230 stores therein a model information management database DB1, an updating software management database DB2, and an updating software storing database DB3.

The data structures of the model information management database DB1, the updating software management database DB2, and the updating software storing database DB3 are similar to those of the model information management database DB1, the updating software management database DB2, and the updating software storing database DB3 stored in the storage unit 133 of the server 130 as shown in FIG. 4 to FIG. 6. Therefore, descriptions of them are omitted here.

(Short-Range Wireless Communication Unit)

The short-range wireless communication unit 240 in the terminal device 200(1) (distribution source) performs short-range wireless communication with the short-range wireless communication units 240 of the terminal device 200(2) (distribution source) and the terminal devices 200(3) to 200(n) (non-distribution sources). Further, the short-range wireless communication unit 240 in the terminal device 200(2) (distribution source) performs short-range wireless communication with the short-range wireless communication units 240 of the terminal device 200(1) (distribution source) and the terminal devices 200(3) to 200(n) (non-distribution sources).

Examples of the short-range wireless communication includes wireless communication of several meters to approximately 100 meters, such as wireless LAN (Local Area Network) communication which allows communication at a short distance of several tens of meters to approximately 100 meters, and wireless PAN (Personal Area Network) communication which allows communication at a short distance of several meters to several tens of meters.

An example of the wireless LAN communication is wireless LAN communication based on IEEE802.11 standard, typically WiFi (Registered Trademark) standard. An example of the wireless PAN communication is wireless PAN communication based on IEEE802.15 standard, typically Bluetooth (Registered Trademark) standard. In this example, the short-range wireless communication units 240 is configured to perform wireless LAN communication according to the IEEE 802.11 standard.

(Signal Communication Unit)

The signal communication unit 250 exchanges information with the control devices 113(1) to 113(m) of the work units 111(1) to 111(m), by communication according to a communication standard such as the CAN standard.

(Power Source Control Unit)

The power source control unit 260 supplies electric power to the control unit 210. In the present embodiment, the power source control unit 260 is connected to the battery BT irrespective of the ON/OFF state of the start switch SW. Specifically, an input end power source line (not shown) of the power source control unit 260 and the battery BT are connected via the power source connection line L3. This way, the electric power from the battery BT is always supplied to the power source control unit 260.

Further, to the control unit 210, the electric power from the battery BT is supplied via the power source control unit 260.

—Software Configuration of Dedicated Terminal Device (Distribution Source)—

Figure 7:
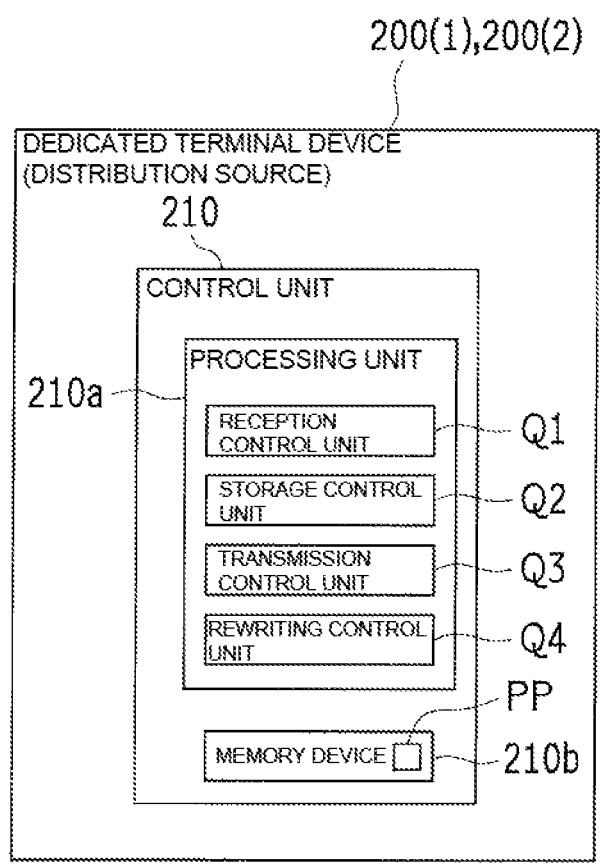
FIG. 7 is a block diagram showing an exemplary software configuration of the dedicated terminal device (distribution source) shown in FIG. 1 to FIG. 3.

FIG. 7 is a block diagram showing an exemplary software configuration of the dedicated terminal device [200(1), 200(2)] (distribution source) shown in FIG. 1 to FIG. 3.

As shown in FIG. 7, the control unit 210 includes a reception control unit Q1, a storage control unit Q2, and a transmission control unit Q3. In other words, the software rewriting program PP causes the control unit 210 to execute steps including: a reception control step corresponding to the reception control unit Q1; a storage control step corresponding to the storage control unit Q2; and a transmission control step corresponding to the transmission control unit Q3. It should be noted that a rewriting control unit Q4 and a rewriting control step will be described later.

(Reception Control Step)

In the reception control step, the control unit 210 receives, via the wide area network WN and the wide area communication unit 220, updating software packages WFW in the updating software storing database DB3 from the server 130 having the updating software storing database DB3 storing the updating software packages WFW.

Specifically, the control unit 210 receives, via the wide area network WN and the wide area communication unit 220, pieces of model information MI and the updating software packages WFW associated with pieces of model information MI in the updating software database DB from the server 130. In the present embodiment, the control unit 210 receives, via the wide area network WN and the wide area communication unit 220, pieces of model information MI and the updating software packages WFW associated with pieces of model information MI, from the server 130 having, in its storage unit 230, the model information management database DB1 storing pieces of model information MI of movable objects 110(1) to 110(n), the updating software management database DB2 storing updating software codes WFWC associated with the pieces of model information MI of the movable objects 110(1) to 110(n) along with control device codes CC, and the updating software storing database DB3 storing updating software packages WFW associated with the updating software codes WFWC.

More specifically, the control unit 210 receives, via the wide area network WN and the wide area communication unit 220, updating software packages WFW and pieces of update information RI of the updating software packages WFW from the updating software database DB of the server 130. In the present embodiment, the control unit 210 receives, via the wide area network WN and the wide area communication unit 220, the updating software codes WFWC and the pieces of update information RI of the updating software codes WFWC from the server 130.

(Storage Control Step)

In the storage control step, the control unit 210 stores, in the storage unit 230, the updating software packages WFW received from the server 130.

Specifically, the control unit 210 stores, in the storage unit 230, the pieces of model information MI and updating software packages WFW associated with the pieces of model information MI which are received from the server 130. In the present embodiment, the control unit 210 stores the pieces of model information MI received from the server 130 in the model information management database DB1 of the storage unit 230, stores the updating software codes WFWC received from the server 130 along with the control device codes CC in association with the pieces of model information MI in the updating software management database DB2 of the storage unit 230, and stores the updating software packages WFW received from the server 130 in association with the updating software codes WFWC in the updating software storing database DB3 of the storage unit 230.

More specifically, the control unit 210 stores, in the storage unit 230, the updating software packages WFW and the pieces of update information RI of the updating software packages WFW received from the server 130. In the present embodiment, the control unit 210 stores the updating software codes WFWC and the pieces of update information RI of the updating software codes WFWC having received from the server 130, in the updating software management database DB2. Further, the control unit 210 stores the updating software codes WFWC and the updating software packages WFW associated with the updating software codes WFWC having received from the server 130 in the updating software storing database DB3.

(Transmission Control Step)

In the transmission control step, the control unit 210 transmits an updating software package WFW stored in the storage unit 230 to another movable object 110(i) via the short-range wireless communication unit 240 and the short-range wireless communication network LN.

Specifically, the control unit 210 specifies, from the pieces of model information MI stored in its storage unit 230, a piece of model information MI of a movable object 110(i) on the other end, and transmits an updating software package WFW corresponding to the piece of model information MI of the movable object 110(i) on the other end, out of the updating software packages WFW stored in the storage unit 230, to the movable object 110(i) on the other end via the short-range wireless communication unit 240 and the short-range wireless communication network LN. In the present embodiment, the control unit 210 specifies a piece of model information MI of the movable object 110(i) on the other end from the pieces of model information MI stored in the model information management database DB1. At this time, the control unit 210 is in a communication state with the movable object 110(i) on the other end, and has acquired the piece of model information MI of the destination mobile unit 110(i). Further, the control unit 210 specifies an updating software code WFWC corresponding to the specified piece of model information MI of the movable object 110(i) on the other end, from the updating software codes WFWC stored in the updating software management database DB2. Then, the control unit 210 transmits, to the movable object 110(i) on the other end via the short-range wireless communication units 240 and the short-range wireless communication network LN, the updating software package WFW corresponding to the specified updating software code WFWC out of the updating software packages WFW stored in the updating software storing database DB3.

Prior to transmission of the updating software package WFW to the movable objects 110(i) on the other end, the control unit 210 may transmit a piece of update information RI of the updating software package WFW stored in the storage unit 230 to the movable object 110(i) on the other end, via the short-range wireless communication units 240 and the short-range wireless communication network LN.

This way, in a movable object 110(i) on the other end, the piece of update information RI such as the version VR and the like of the software package FW of the control device [113(1) to 113(m)] before rewriting can be compared with the piece of update information RI such as the version VR and the like of the updating software package WFW. Then, whether or not the software package FW of the control device [113(1) to 113(m)] before rewriting is the latest package may be determined. If the package is determined as not to be the latest one, the updating software package WFW for the latest package may be requested to the terminal device 200(1) (distribution source) or the terminal device 200(2) (distribution source), whereas if the package is determined as to be the latest one, the updating software package WFW for the latest package is not requested to the terminal device 200(1) (distribution source) or the terminal device 200(2) (distribution source). Thus, whether or not the software package FW for the control device [113(1) to 113(m)] is the latest package can be recognized in the movable object 110(i) on the other end, before transmission of the updating software package WFW to the movable object 110(i) on the other end. Hence, unnecessary transmission operation of updating software packages WFW to a movable object 110(i) on the other end can be omitted.

Further, prior to transmission of the updating software package WFW to the movable object 110(i) on the other end, the control unit 210 may receive, from the movable object 110(i) on the other end, the piece of update information RI of the software package FW for the control device [113(1) to 113(m)] in the movable object 110(i) on the other end before rewriting. Then, the control unit 210 can compare the received piece of update information RI such as the version VR and the like of the software package FW with the piece of update information RI such as the version VR and the like of the updating software package WFW stored in the storage unit 230, and determine whether or not the software package FW of the control device [113(1) to 113(m)] before rewriting is the latest package. If the package is determined as not to be the latest one, the latest updating software package WFW may be transmitted to the movable object 110(i) on the other end, whereas if the package is determined as to be the latest, the latest updating software package WFW may not be transmitted to the movable object 110(i) on the other end.

Thus, whether or not the software package FW for the control device [113(1) to 113(m)] is the latest package can be recognized in the terminal device 200(1) (distribution source) or the terminal device 200(2) (distribution source), before transmission of the updating software package WFW to the movable object 110(i) on the other end. Hence, unnecessary transmission operation of updating software packages WFW to movable objects 110(i) on the other end can be omitted.

(Rewriting Control Step)

As shown in FIG. 7, the control unit 210 further includes the rewriting control unit Q4. In other words, the software rewriting program PP causes the control unit 210 to execute steps further including the rewriting control step corresponding to the rewriting control unit Q4.

The terminal devices 200(1) and 200(2) (distribution sources) are provided to the movable objects 110(1) and 110(2), respectively.

In the rewriting control step, the control unit 210 specifies an updating software package WFW corresponding to the piece of model information MI of a movable object 110(i) on the other end out of the updating software packages WFW stored in the storage unit 230, and generates the latest software package FW for the control device [113(1) to 113(m)] mounted in the movable object 110(i) on the other end, based on the specified updating software package WFW. In the above-described transmission control step, the control unit 210 transmits the latest software package FW generated to the control device [113(1) to 113(m)] mounted in the movable object 110(i) on the other end. Then, the terminal device (i) or the control device [113(1) to 113(m)] in the movable object 110(i) on the other end rewrites the software package FW to the latest one.

Further, in the rewriting control step, the control unit 210 specifies an updating software package WFW corresponding to the piece of model information MI of the own movable object [110(1), 110(2)] out of the updating software packages WFW stored in the storage unit 230, and generates the latest software package FW for the control device [113(1) to 113(m)] mounted in the own movable object [110(1), 110(2)], based on the specified updating software package WFW. In the above-described transmission control step, the control unit 210 transmits the latest software package FW generated to the control device [113(1) to 113(m)] mounted in the own movable object [110(1), 110(2)]. Then, the terminal device (i) or the control device [113(1) to 113(m)] rewrites the software package FW to the latest one in the own movable object [110(1), 110(2)].

Storing updating software packages WFW associated with pieces of model information MI for movable objects 110(1) to 110(n) of all types, and for movable objects 110(1) to 110(n) of all models in the storage unit 230, increases the data volume, consequently leading to increases in the storage volume of the storage unit 230 and the communication time.

In view of this, the updating software database DB stores pieces of area information AR (see FIG. 8 and FIG. 9 described later) indicative of control areas of the movable objects 110(1) to 110(n) in association with terminal identification information ID (see FIG. 9) of each of the terminal devices 200(1) and 200(2) (distribution source). The terminal identification information ID of the terminal devices 200(1) to 200(n) may be, for example, serial numbers and phone numbers; however, is not limited to these provided that the terminal devices 200(1) to 200(n) are uniquely distinguishable.

FIG. 8 is a schematic view showing an exemplary data structure with pieces of area information AR added in the model information management database DB1 shown in FIG. 4. FIG. 9 is a schematic view showing an exemplary data structure of the area information management database DB4 constituting the updating software database DB in the storage unit 133 provided to the server 130.

The updating software database DB stores pieces of area information AR indicative of control areas of the movable objects 110(1) to 110(n) in association with terminal identification information ID of each of the terminal devices 200(1) and 200(2) (distribution source).

In the present embodiment, the updating software database DB further includes the area information management database DB4. Further, the pieces of area information AR are added in the model information management database DB1 shown in FIG. 4.

In the reception control step, the control unit 210 receives, from the server 130 via the wide area network WN and the wide area communication unit 220, piece of model information MI and the updating software package WFW associated with the piece of model information MI, the piece of model information MI corresponding to the piece of area information AR associated with the terminal identification information ID of the terminal device 200(1) or 200(2) (distribution source), in the updating software database DB. In the present embodiment, the control unit 210 receives, from the server 130 via the wide area network WN and the wide area communication unit 220, piece of model information MI and the updating software package WFW associated with the piece of model information MI, the piece of model information MI corresponding to the piece of area information AR associated with the terminal identification information ID of the terminal device 200(1) or 200(2) (distribution source).

In the storage control step, the control unit 210 stores, in the storage unit 230, a piece of model information MI of a piece of area information AR thereof and updating software package WFW associated with the piece of model information MI which are received from the server 130. In the present embodiment, the control unit 210 stores the piece of model information MI received from the server 130, the piece of model information MI associated with the piece of area information AR associated with the terminal identification information ID of the terminal device [200(1), 200(2)] (distribution source), in the model information management database DB1 (see FIG. 8) of the storage unit 230. The control unit 210 stores the updating software codes WFWC received from the server 130 along with the control device codes CC in association with the piece of model information MI in the updating software management database DB2 (see FIG. 5) of its storage unit 230. The control unit 210 stores the updating software packages WFW received from the server 130 in association with the updating software codes WFWC in the updating software storing database DB3 (see FIG. 6) in the storage unit 230. With this configuration the control unit 210 is able to selectively store updating software packages WFW related to models having the same piece of area information AR as itself.

[Dedicated Terminal Device (Non-Distribution Source)]

As shown in FIG. 3, the terminal devices 200(3) to 200(n) (non-distribution sources) each has updating software packages WFW which do not have pieces of model information MI of other movable objects 110(i) in the terminal devices 200(1) and 200(2) (distribution source). Specifically, although the terminal devices 200(3) to 200(n) (non-distribution sources) each has an updating software management database DB2 and an updating software storing database DB3 storing updating software packages WFW which do not have the pieces of model information MI of the other movable objects 110(i); however, does not have a model information management database DB1 and an area information management database DB4.

Second Embodiment

Figure 10:
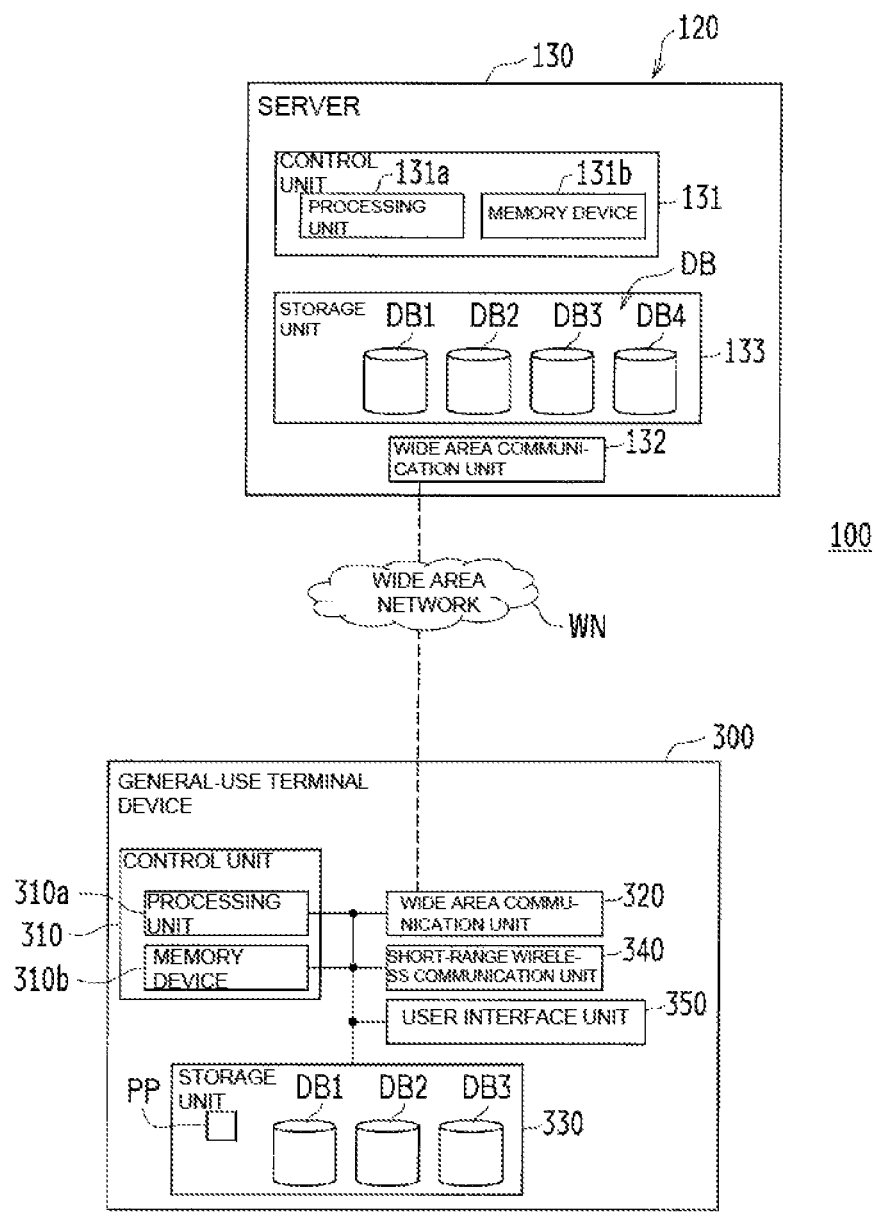
FIG. 10 is a structural diagram schematically showing an example software rewriting system related to a second embodiment, and provides a schematic view of a state where a general-use terminal device is communicating with a server via a wide area network.
Figure 11:
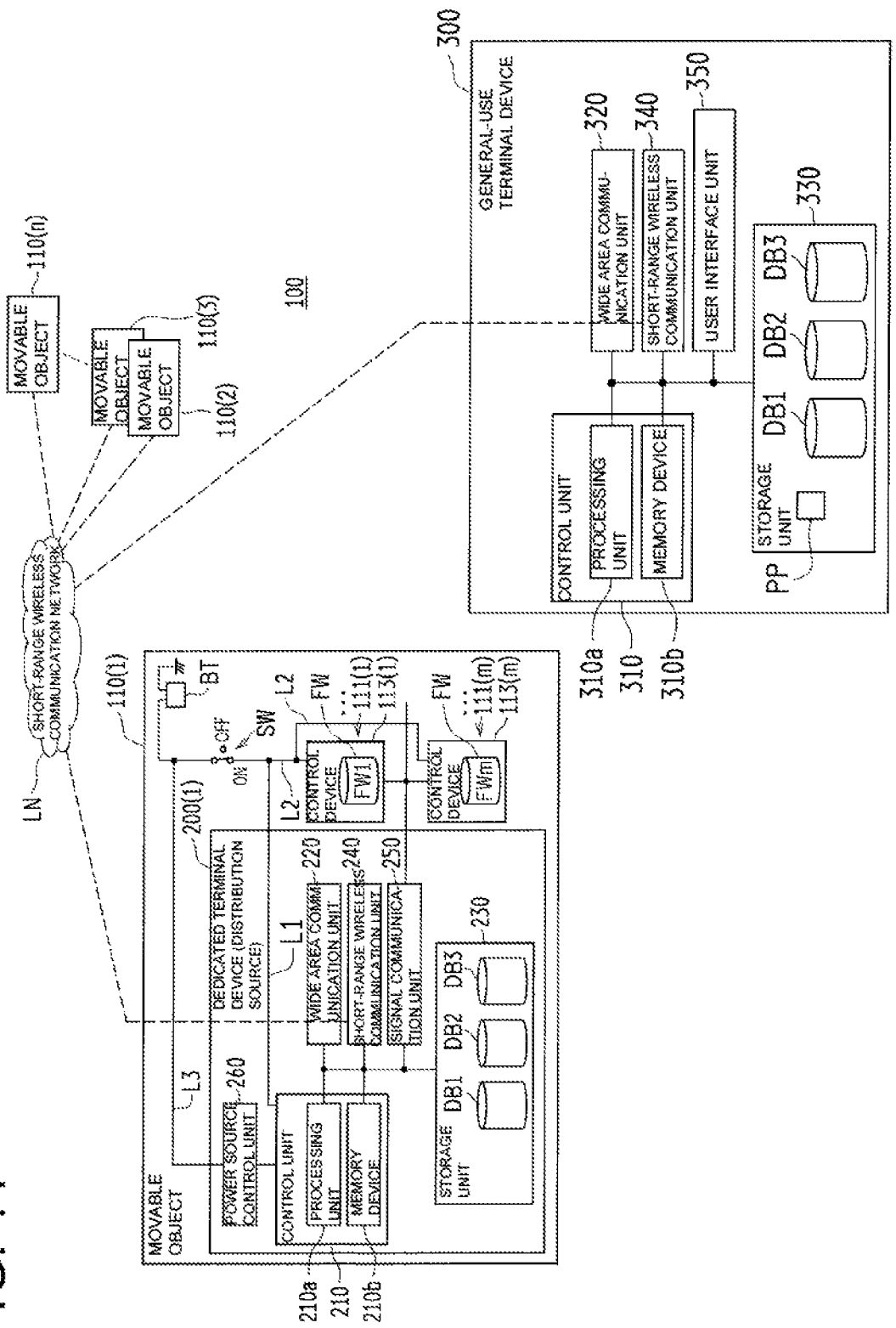
FIG. 11 is a schematic view showing a state where the general-use terminal device having communicated with the server is communicating, via a short-range wireless communication network, with a dedicated terminal device that could serve as a distribution source, in the software rewriting system shown in FIG. 10.
Figure 12:
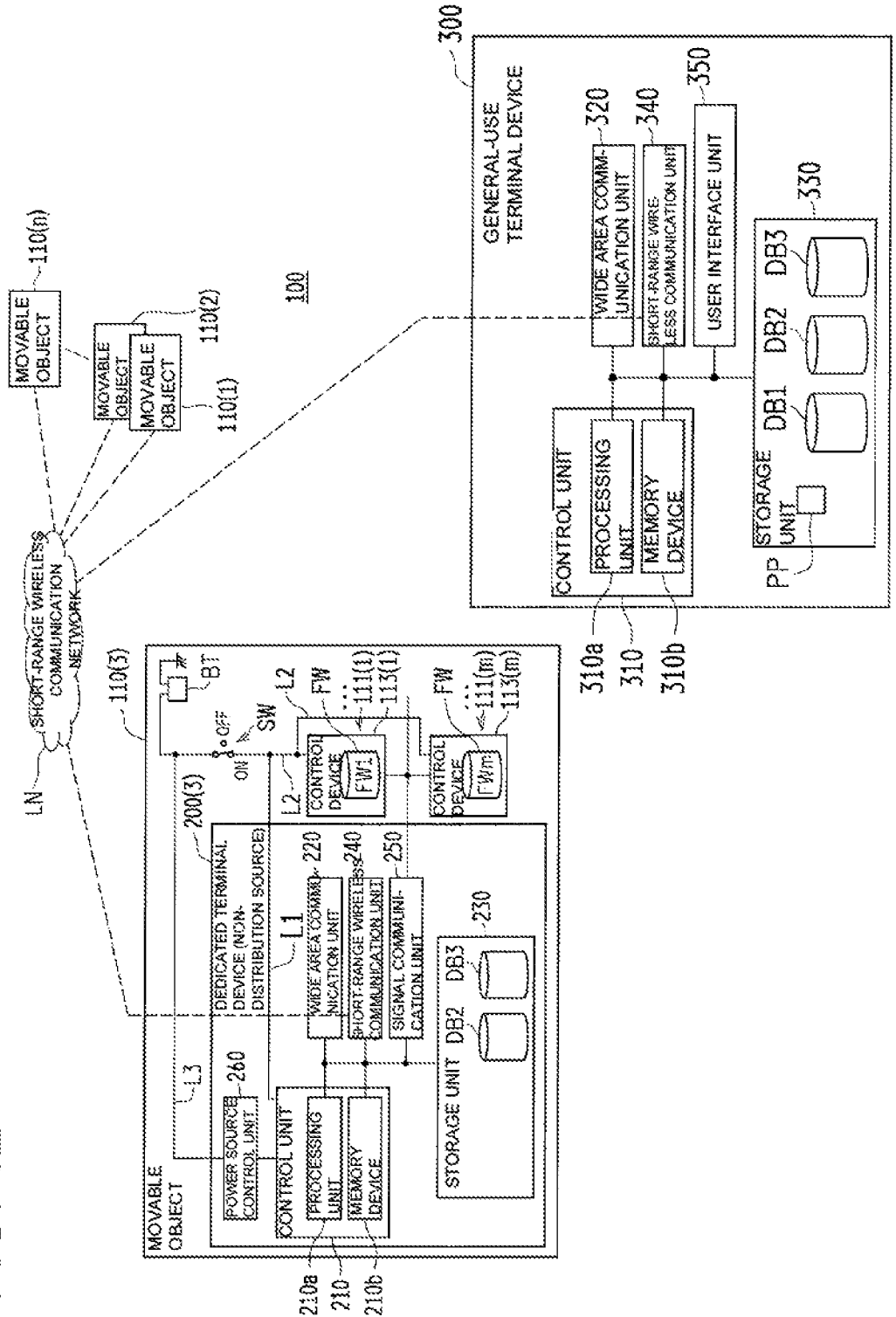
FIG. 12 is a schematic view showing a state where the general-use terminal device having communicated with the server is communicating, via a short-range wireless communication network, with a dedicated terminal device that does not substantially serve as a distribution source, in the software rewriting system shown in FIG. 10.

FIG. 10 to FIG. 12 are structural view schematically showing an exemplary software rewriting system 100 related to a second embodiment.

FIG. 10 is a schematic view of a state where a general-use terminal device 300 is communicating with the server 130 via a wide area network WN. FIG. 11 is a schematic view showing a state where the general-use terminal device 300 having communicated with the server 130 is communicating, via a short-range wireless communication network LN, with a dedicated terminal device 200(1) that could serve as a distribution source, in the software rewriting system 100 shown in FIG. 10. FIG. 12 is a schematic view showing a state where the general-use terminal device 300 having communicated with the server 130 is communicating, via a short-range wireless communication network LN, with a dedicated terminal device 200(3) that does not substantially serve as a distribution source, in the software rewriting system 100 shown in FIG. 10.

The software rewriting system 100 related to the second embodiment includes a general-use terminal device 300 in the software rewriting system 100 related to the first embodiment.

Next, a system configuration of the general-use terminal device (300) is described with reference to FIG. 10 to FIG. 12.

[General-Use Terminal Device]

—Hardware Configuration of General-Use Terminal Device—

As shown in FIG. 10 to FIG. 12, the terminal device 300 includes a control unit 310 (an example of computer), a wide area communication unit 320, a storage unit 330, a short-range wireless communication unit 340, and a user interface unit 350. It should be noted that a plurality of terminal devices 300 may be provided.

Here, the general-use terminal device 300 is, for example, a multi-function portable communication terminal device such as a tablet computer, a smartphone, and the like. The terminal identification information ID of the terminal devices 200(1) to 200(n) may be, for example, serial numbers, the International Mobile Equipment Identifier (IMEI) numbers, and phone numbers; however, is not limited to these provided that the terminal devices 200(1) to 200(n) are uniquely distinguishable.

(Control Unit)

The control unit 310 includes: a processing unit 310a constituted by a so-called computer such as a CPU (Central Processing Unit); and a memory unit 310b including a volatile memory such as a ROM (Random Only Memory), a RAM (Random Access Memory).

The control unit 310 is configured to achieve various functions necessary for the control unit 310, by running programs such as software rewriting program PP which is stored (installed) in advance in the storage unit 330. Specifically, the control unit 310 is configured to perform various processes by having a processing unit 310a thereof load a program such as the software rewriting program PP stored in advance in the storage unit 330 into the RAM of the memory device 310b, and running that program. The RAM of the memory device 310b provides a working area to the control unit 310.

In the present embodiment, the control unit 310 controls transmission/reception of data during communications, various inputs and outputs, and arithmetic processing.

(Wide Area Communication Unit)

The wide area communication unit 320 is electrically connected to a data line of the control unit 310. With instructions from the control unit 310, the wide area communication unit 320 is able to perform communication using the same communication protocol as the wide area communication unit 132 (see FIG. 10) of the server 130. Data transmitted/received during communication is converted by the wide area communication unit 320 so as to comply with the communication protocol. Further, the wide area communication unit 320 receives, from the server 130, information regarding software packages FW of the control devices 113(1) to 113(m) in the movable objects 110(1) to 110(n), which information is stored in the storage unit 133 of the server 130.

(Storage Unit)

The storage unit 330 is electrically connected to a data line of the control unit 310. With instructions from the control unit 310, the storage unit 330 controls writing and reading of information. The storage unit 330, in this example, is a large-capacity storage unit such as a flush memory. It should be noted that, the software rewriting program PP is stored (installed) in advance in the storage unit 330.

It should be noted that, the software rewriting program PP, in this example, is a program so-called an app used in a multi-function portable communication terminal device such as a tablet computer and a smartphone, and is downloaded from a not-shown program server via communication means such as the internet.

The storage unit 330 stores therein a model information management database DB1, an updating software management database DB2, and an updating software storing database DB3.

The data structures of the model information management database DB1, the updating software management database DB2, and the updating software storing database DB3 are similar to those of the model information management database DB1, the updating software management database DB2, and the updating software storing database DB3 stored in the storage unit 133 of the server 130 as shown in FIG. 4 to FIG. 6. Therefore, descriptions of them are omitted here.

(Short-Range Wireless Communication Unit)

The short-range wireless communication unit 340 in the terminal device 300 performs short-range wireless communication with short-range wireless communication units 240 of the terminal devices 200(1) to 200(n).

(User Interface Unit)

The user interface unit 350 includes an output device such as a display device and an input device such as touch panel. Typically, the user interface unit 350 is capable of activating and controlling the software rewriting program PP, and displaying progress information and the like.

—Software Configuration of General-Use Terminal Device—

Figure 13:
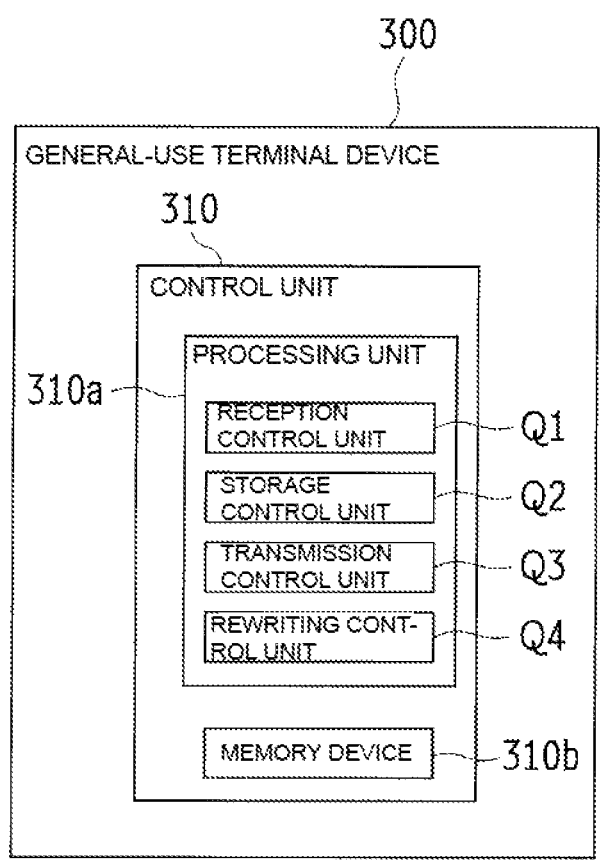
FIG. 13 is a block diagram showing an exemplary software configuration of the general-use terminal device shown in FIG. 10 to FIG. 12.

FIG. 13 is a block diagram showing an exemplary software configuration of the general-use terminal device 300 shown in FIG. 10 to FIG. 12.

As shown in FIG. 13, the control unit 310 includes a reception control unit Q1, a storage control unit Q2, a transmission control unit Q3, and a rewriting control unit Q4. In other words, the software rewriting program PP causes the control unit 310 to execute steps including: a reception control step corresponding to the reception control unit Q1; a storage control step corresponding to the storage control unit Q2; a transmission control step corresponding to the transmission control unit Q3; and a rewriting control step corresponding to the rewriting control unit Q4.

It should be noted that the reception control step, the storage control step, the transmission control step, and the rewriting control step performed by the control unit 310 are similar to the reception control step, the storage control step, the storage control step, the transmission control step, and the rewriting control step performed by the control unit 210 of each of the above-described dedicated terminal devices 200(1) and 200(2). Therefore, descriptions for these steps are omitted.

Further, the configuration of the software rewriting system 100 related to the first embodiment may be combined with the configuration of the software rewriting system 100 related to the second embodiment.

[Software Rewriting Process in the Software Rewriting System]

Figure 14:
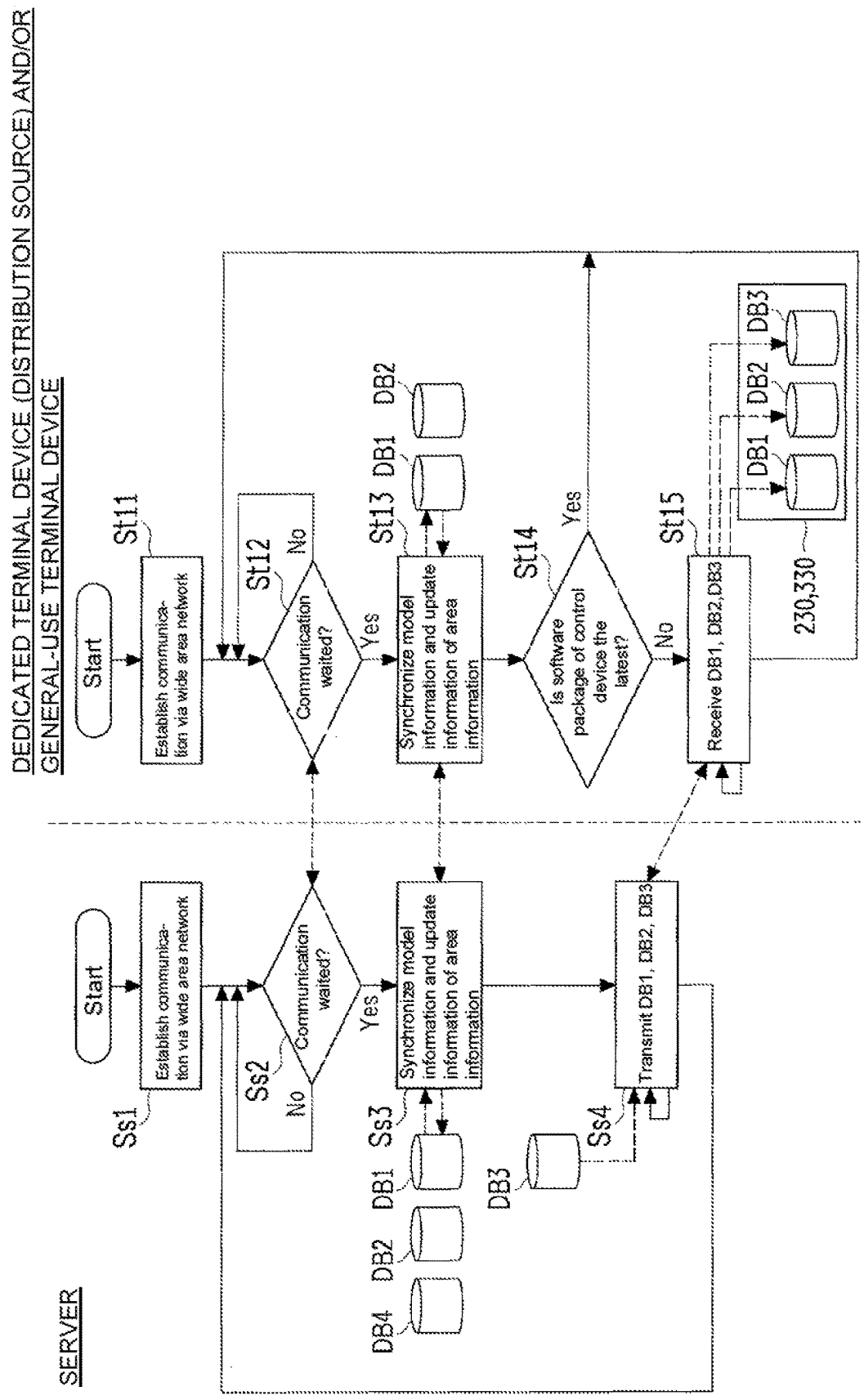
FIG. 14 is a flowchart showing an exemplary process of rewriting software, in the software rewriting system shown in FIG. 1 to FIG. 13, and is a flowchart showing an example (an example of download process) where a dedicated terminal device (distribution source) and/or a general-use terminal device are communicating with a server via a wide area network.
Figure 15:
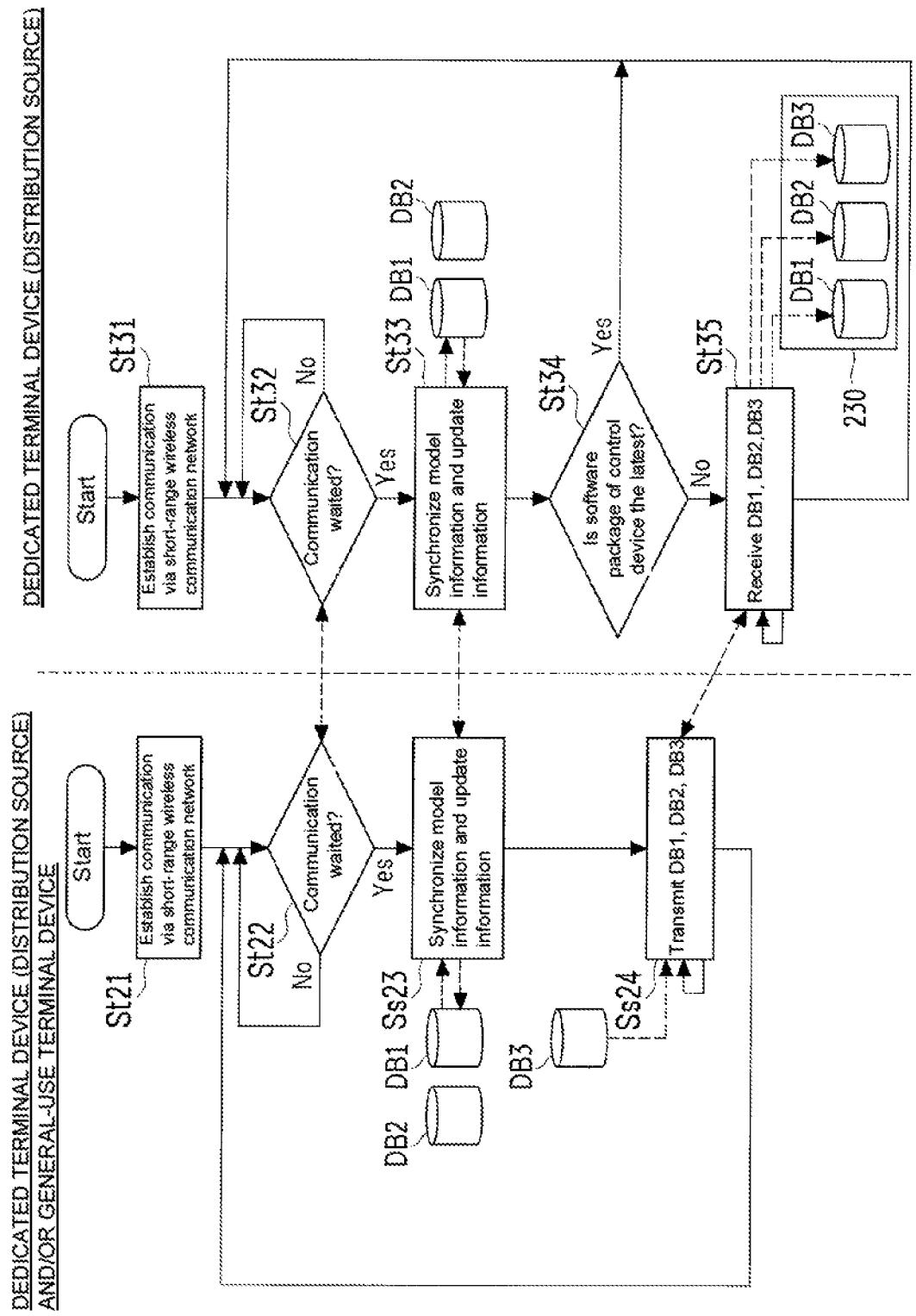
FIG. 15 is a flowchart showing an exemplary software rewriting process, in the software rewriting system shown in FIG. 1 to FIG. 13, and is a flowchart showing an example (an example of distribution process) where a dedicated terminal device (distribution source) and/or a general-use terminal device having communicated with a server is/are communicating with another dedicated terminal device (distribution source) via a short-range wireless communication network.
Figure 16:
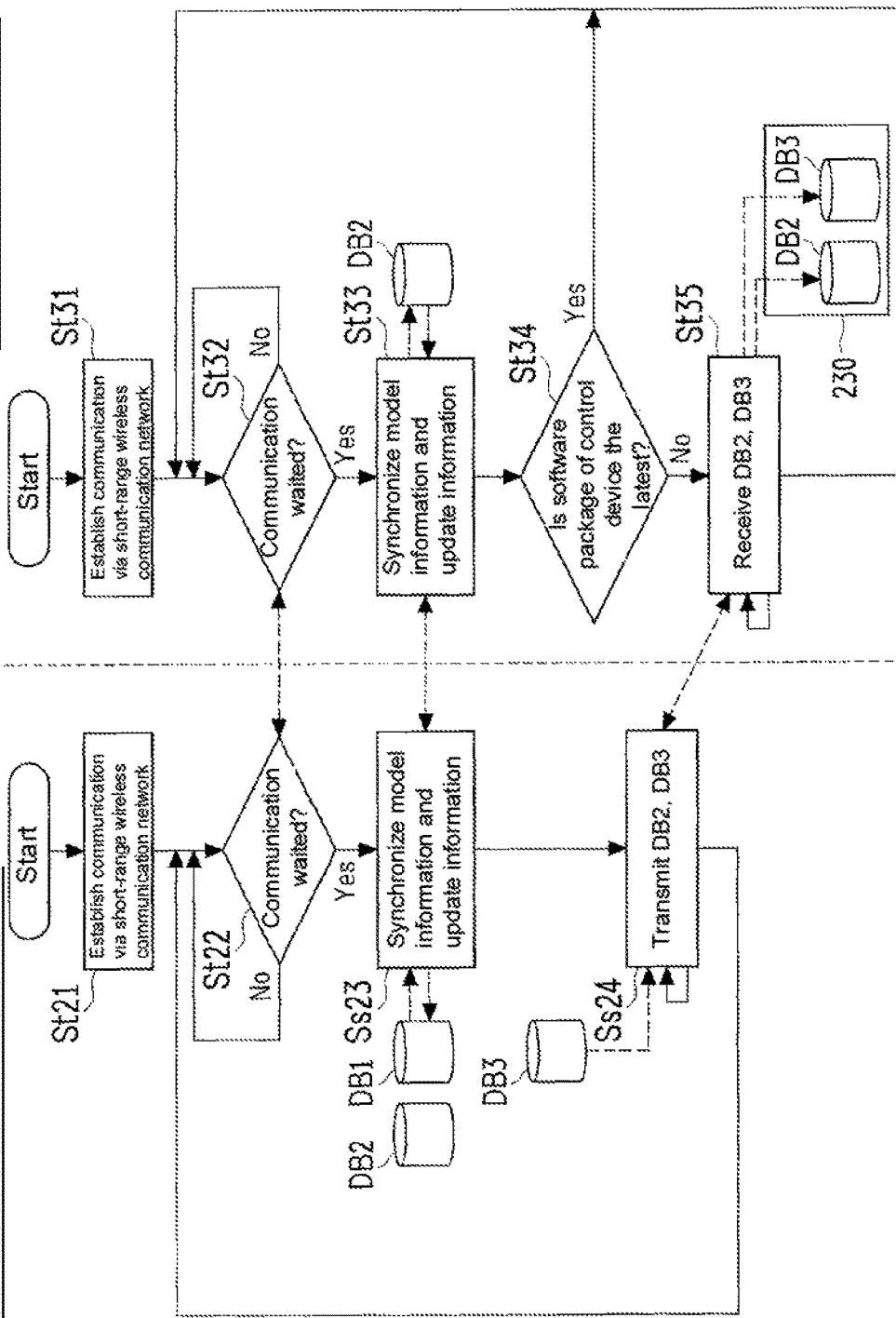
FIG. 16 is a flowchart showing an exemplary software rewriting process, in the software rewriting system shown in FIG. 1 to FIG. 13, and is a flowchart showing an example (another example of distribution process) where a dedicated terminal device (distribution source) and/or a general-use terminal device having communicated with a server is/are communicating with another dedicated terminal device (non-distribution source) via a short-range wireless communication network.

Next, the following describes, with reference to FIG. 14 to FIG. 16, an exemplary software rewriting process in the software rewriting system 100.

FIG. 14 to FIG. 16 are each a flowchart showing an exemplary software rewriting process taking place in the software rewriting system 100 shown in FIG. 1 to FIG. 13. FIG. 14 is a flowchart showing an example (an example of download process) where a dedicated terminal device [200(1), 200(2)] (distribution source) and/or a general-use terminal device 300 is/are communicating with a server 130 via a wide area network WN. FIG. 15 is a flowchart showing an example (an example of distribution process) where a dedicated terminal device [200(1), 200(2)] (distribution source) and/or a general-use terminal device 300 having communicated with the server 130 is/are communicating with the dedicated terminal device [200(2), 200(1)] (distribution source) via a short-range wireless communication network LN. FIG. 16 is a flowchart showing an example (another example of distribution process) where a dedicated terminal device [200(1), 200(2)] (distribution source) and/or a general-use terminal device 300 having communicated with a server 130 is/are communicating with another dedicated terminal device 200(3) to 200(n) (non-distribution source) via a short-range wireless communication network LN.

It should be noted that, the exemplary processes shown in FIG. 14 and FIG. 15 adopts a model information management database DB1 (see FIG. 8) which additionally has the pieces of area information AR associated with terminal identification information ID of each of the terminal devices 200(1) and 200(2) (distribution sources) in the area information management database DB4 (see FIG. 9).

—Exemplary Download Process Shown in FIG. 14—

In the flowchart of the software rewriting process shown in FIG. 14, first, the control unit 131 in the server 130 causes the wide area communication unit 132 to establish communications with the dedicated terminal device [200(1), 200(2)] (distribution source) and/or the general-use terminal device 300 (hereinafter, these terminal devices may be simply referred to as terminal device [200, 300]) (Step Ss1), via a wide area network WN. Then, communication from the terminal device [200, 300] is waited (step Ss2), and stays in the standby state until a response from the terminal device [200, 300] is received (Step Ss2).

Meanwhile, the control unit [210, 310] in the terminal device [200, 300] causes its wide area communication unit [220, 320] to establish communication with the server 130 via the wide area network WN in an area with sufficiently developed communication infrastructure (Step St11). Then, communication from the server 130 is waited (St12), and stays in the standby state until a response from the server 130 is received (Step St12: No).

Next, when a response is received from the terminal device [200, 300] (Step Ss2: Yes), the control unit 131 of the server 130 synchronizes, with the terminal device [200, 300], the piece of model information MI and the piece of update information RI of an updating software package WFW of a movable object 110 corresponding to the piece of area information AR which is associated with the terminal identification information ID of the terminal device [200, 300] (Step Ss3). Then, the control unit 131 transmits information containing the updating software package WFW to the terminal device [200, 300] (Step Ss4).

Specifically, the control unit 131 in the server 130 receives the terminal identification information ID of the terminal device [200, 300]. Then, from the storage unit 133, the control unit 131 retrieves piece of model information MI corresponding to the piece of area information AR associated with the terminal identification information ID of the terminal device [200, 300] and an updating software package WFW associated with the piece of model information MI. These pieces of information are then transmitted to the terminal device [200, 300] via the wide area network WN and the wide area communication unit 220, 320. In the above, for example, where the terminal identification information ID is #5555, the area information is A6 (see FIG. 9). Where the area information is A6, the model code is BT2, . . . (see FIG. 8). Further, where the model information is BT2, . . . , the updating software code is BT2ECU1FW1 in FIG. 5 and is BT2ECU1FW1.WFW, . . . in FIG. 6.

In other words, the control unit 131 in the server 130 transmits the model information management database DB1, the updating software management database DB2, and the updating software storing database DB3, each storing data corresponding to the piece of area information AR, to the terminal device [200, 300] via the wide area network WN and the wide area communication unit [220, 320].

Meanwhile, when a response from the server 130 is received (Step St12: Yes), the control unit [210, 310] in the terminal device [200, 300] synchronizes, with the server 130, the pieces of model information MI and the pieces of update information RI of updating software packages WFW of movable objects 110 corresponding to the piece of area information AR associated with the terminal identification information ID of the terminal device [200, 300] (Step St13). Then, for each of the movable objects 110, if the software package FW for the control device [113(1) to 113(*m*)] is not the latest package (e.g., not the latest version, or not with the latest date and time) (Step St14), the control unit [210, 310] receives the updating software package WFW (Step St15), and stores the received information in the storage unit 230, 330.

Specifically, the control unit [210, 310] in the terminal device [200, 300] receives the piece of model information MI corresponding to the piece of area information AR associated with the terminal identification information ID of the terminal device [200, 300] and updating software package WFW associated with the piece of model information MI, from the server 130 via the wide area network WN and the wide area communication unit [220, 320]. The pieces of information received are then stored in the storage unit 230, 330. In the above, for example, where the terminal identification information ID is #5555, the area information is A6 (see FIG. 9). Where the area information is A6, the model code is BT2, . . . in FIG. 8. Further, where the model code is BT2, . . . , the updating software code is BT2ECU1FW1 (see FIG. 5) and is BT2ECU1FW1.WFW, . . . in FIG. 6.

In other words, the control unit [210, 310] in the terminal device [200, 300] receives (downloads) the model information management database DB1, the updating software management database DB2, and the updating software storing database DB3 each storing data corresponding to the piece of area information AR, from the server 130 via the wide area network WN and the wide area communication unit [220, 320]. The received pieces of information is then stored in the storage unit 230, 330.

Then, in the terminal device [200(1), 200(2)] of the movable object [110(1), 110(2)] which is the download destination, if the software package FW for the control device 113(1) to 113(*m*) is not the latest package (e.g., not the latest version, or not with the latest date and time), the control unit 210 or its control device [113(1) to 113(*m*)] rewrites the software package FW for the control device [113(1) to 113(*m*)] based on the updating software package WFW.

—Exemplary Distribution Process Shown in FIG. 15 and FIG. 16—

FIG. 15 and FIG. 16 are each a flowchart showing a software rewriting process. First, in an area where a short-range wireless communication network LN is installed, the control unit 210 of the dedicated terminal device [200(1), 200(2)] (distribution source) and/or the control unit 310 of the general-use terminal device 300 (see left side of FIG. 15 and FIG. 16) establish(es) communication with the dedicated terminal device [200(2), 200(1)] (distribution source; see FIG. 15) or the dedicated terminal device 200(3) to 200(*n*) (non-distribution source) (see FIG. 16) via the short-range wireless communication unit 240 and/or the short-range wireless communication unit 340 and the short-range wireless communication network LN (Step St21). Then, communication from the dedicated terminal device [200(2), 200(1)] (distribution source) or the dedicated terminal device 200(3) to 200(*n*) (non-distribution sources) is waited (St22), and a standby state is continued until there is a response from the dedicated terminal device [200(2), 200 (1)] (distribution source) or the dedicated terminal device 200(3) to 200(*n*) (non-distribution source) (Step St22: No).

Meanwhile, the control unit 210 (see right side of FIG. 15 and FIG. 16) in the dedicated terminal device [200(2), 200(1)] (distribution source) or the dedicated terminal device 200(3) to 200(*n*) (non-distribution source) establishes communication with the dedicated terminal device [200(1), 200(2)] (distribution source) and/or the general-use terminal device 300 via the short-range wireless communication unit 240 and/or the short-range wireless communication unit 340 and the short-range wireless communication network LN (Step St31). Then, communication from the dedicated terminal device [200(1), 200(2)] (distribution source) and/or the general-use terminal device 300 is waited (St32), and a standby state is continued until there is a response from the dedicated terminal device [200(1), 200(2)] (distribution source) and/or the general-use terminal device 300 (Step St32: No).

Next, when there is a response from the dedicated terminal device [200(2), 200(1)] (distribution source) or the dedicated terminal device 200(3) to 200(*n*) (non-distribution source) (Step Ss22: Yes), the control unit 210 of the dedicated terminal device [200(1), 200(2)] (distribution source) and/or the control unit 310 of the general-use terminal device 300 (see left side of FIG. 15 and FIG. 16) synchronize(s) the piece of model information MI of the movable object 110 and the piece of update information RI of the updating software package WFW with the dedicated terminal device [200(2), 200(1)] (distribution source) or the dedicated terminal device 200(3) to 200($n$) (non-distribution source) (Step Ss23), and transmit(s) information containing the updating software package WFW (Step Ss24).

Specifically, the control unit 210 of the dedicated terminal device [200(1), 200(2)] (distribution source) and/or control unit 310 of the general-use terminal device 300 retrieves, from the storage unit 230 and/or 330, a piece of model information MI and the updating software package WFW associated with the piece of model information MI, and transmits them to the dedicated terminal device [200(2), 200(1)] (distribution source) or the dedicated terminal device 200(3) to 200($n$) (non-distribution source), via the short-range wireless communication network LN and the short-range wireless communication unit 240 and/or the short-range wireless communication unit 340.

In other words, the control unit 210 of the dedicated terminal device [200(1), 200(2)] (distribution source) and/or the control unit 310 of the general-use terminal device 300 (see FIG. 15) transmit(s) the model information management database DB1, the updating software management database DB2, and the updating software storing database DB3 to the dedicated terminal device [200(2), 200(1)] (distribution source), via the short-range wireless communication network LN and the short-range wireless communication unit 240 and/or the short-range wireless communication unit 340. Further, the control unit 210 of the dedicated terminal device [200(1), 200(2)] (distribution source) and/or the control unit 310 of the general-use terminal device 300 (see FIG. 16) transmit(s) the updating software management database DB2 and the updating software storing database DB3 to the dedicated terminal device 200(3) to 200($n$) (non-distribution source) via the short-range wireless communication unit 240 or the short-range wireless communication unit 340 and the short-range wireless communication network LN.

Meanwhile, when there is a response from the dedicated terminal device [200(1), 200(2)] (distribution source) and/or the general-use terminal device 300 (Step St32: Yes), the control unit 210 of the dedicated terminal device [200(2), 200(1)] (distribution source) or the dedicated terminal device [200(3) to 200($n$)] (non-distribution source) (see right side of FIG. 15 and FIG. 16) synchronizes the piece of model information MI and piece of update information RI of updating software package WFW of the movable object [110(1) to 110($n$)] with the dedicated terminal device [200(1), 200(2)] (distribution source) and/or the general-use terminal device 300 (Step St33). When the software package FW for the control device 113(1) to 113($m$) is not the latest package (e.g., not the latest version, or not with the latest date and time) (Step St34: No), information containing the updating software package WFW is received (Step St35, and the information received is stored in the storage unit 230.

Specifically, the dedicated terminal device [200(2), 200(1)] (distribution source) (see FIG. 15) receives a piece of model information MI and the updating software package WFW associated with the piece of model information MI from the dedicated terminal device [200(1), 200(2)] (distribution source) and/or the general-use terminal device 300 via the short-range wireless communication unit 240 and/or the short-range wireless communication unit 340 and the short-range wireless communication network LN. Then, the information received is stored in the storage unit 230. Further, the dedicated terminal device 200(3) to 200($n$) (non-distribution source) receives the updating software package WFW from the dedicated terminal device [200(1), 200(2)] (distribution source) and/or the general-use terminal device 300 via the short-range wireless communication unit 240 and/or the short-range wireless communication unit 340 and the short-range wireless communication network LN. Then, the information received is stored in the storage unit 230.

In other words, the dedicated terminal device [200(2), 200(1)] (distribution source) (see FIG. 15) stores, in its storage unit 230, the model information management database DB1, the updating software management database DB2, and the updating software storing database DB3. Further, the dedicated terminal device 200(3) to 200($n$) (non-distribution source) stores, in its storage unit 230, the updating software management database DB2, and the updating software storing database DB3.

If the software package FW for the control device [113(1) to 113($m$)] in the terminal device [200(1) to 200($n$)] of the movable object [110(1) to 110($n$)] on the other end is not the latest package (e.g., not the latest version, or not with the latest date and time), the control unit 210 or the control device [113(1) to 113($m$)] mounted in the movable object [110(1) to 110($n$)] rewrites the software package FW for the control device [113(1) to 113($m$)] based on the updating software package WFW.

It should be noted that, if there is an extra volume the storage unit 230 or 330 of the dedicated terminal device [200(1), 200(2)] (distribution source) or the general-use terminal device 300, the server 130 may transmit the model information management database DB1, the updating software management database DB2, the updating software storing database DB3, and the area information management database DB4 containing all pieces of area information AR to the dedicated terminal device [200(1), 200(2)] (distribution source) or the general-use terminal device 300. The terminal device [200(1), 200(2), 300] may store the databases in the storage unit 230. This way, the terminal device [200(1), 200(2), 300] may serve as the server 130.

Regarding the Present Embodiment

The terminal device [200(1), 200(2), 300] related to the present embodiment (first embodiment, second embodiment) can receive updating software packages WFW in the updating software database DB from the server 130 via a wide area network WN and a wide area communication unit [220, 320], and can be a destination of updating software packages WFW from the server 130. Further, since the updating software packages WFW received from the server 130 are stored in the storage unit 230, 330, and the updating software packages WFW stored in the storage unit 230, 330 are transmitted to movable objects [110(2) to 110($n$)], [110(1), 110(3) to 110($n$)], [110(1) to 110($n$)], via the short-range wireless communication unit 240, 340 and a short-range wireless communication network LN. Therefore, the terminal device [200(1), 200(2), 300] can serve as a distribution source of the updating software packages WFW to the movable objects [110(2) to 110($n$)], [110(1), 110(3) to 110($n$)], [110(1) to 110($n$)]. For example, in an area with sufficiently developed communication infrastructure, the terminal device [200(1), 200(2), 300] can receive updating software packages WFW in the updating software database DB from the server 130 via a wide area network WN and the wide area communication unit [220, 320], and can store the updating software packages WFW received from the server 130 in the storage unit 230, 330. Further, since a short-range wireless communication network LN can be installed relatively easily, even in an area with underdeveloped communication infrastructure, the terminal device [200(1), 200(2), 300] in such an area where the short-range wireless communication network LN is installed can transmit the updating software packages WFW stored in the storage unit 230, 330 to movable objects [110(2) to 110(n)], [110(1), 110(3) to 110(n)], [110(1) to 110(n)] via the short-range wireless communication unit 240, 340 and the short-range wireless communication network LN.

Thus, software package FW for a control device [113(1) to 113(m)] mounted in movable object [110(1) to 110(n)] can be reliably rewritten even in an area with underdeveloped communication infrastructure.

Further, in each of the terminal devices 200(1), 200(2), 300 of the present embodiment, pieces of model information MI and updating software packages WFW associated with the pieces of model information MI received from the server 130 are stored in the storage unit [230, 330]. Apiece of model information MI of a movable object [110(2) to 110(n)], [110(1), 110(3) to 110(n)], [110(1) to 110(n)] on other end is specified from the pieces of model information MI stored in the storage unit [230, 330]. Of the updating software packages WFW stored in the storage unit [230, 330], an updating software package WFW corresponding to the piece of model information MI of the movable object [110(2) to 110(n)], [110(1), 110(3) to 110(n)], [110(1) to 110(n)] on the other end is transmitted to the movable object [110(2) to 110(n)], [110(1), 110(3) to 110(n)], [110(1) to 110(n)] on the other end, via the short-range wireless communication unit [240, 340] and the short-range wireless communication network LN. Therefore, updating software packages WFW corresponding to software packages FW for the control devices 113(1) to 113(m) mounted in the movable objects 110(1) to 110(n) can be stored in the storage unit [230, 330], even if the types of the movable objects 110(1) to 110(n) (e.g., movable work machines, ships) are different, or even if models of the movable objects 110(1) to 110(n) of the same type are different. Therefore, all of the movable objects 110(1) to 110(n) can be supported, including movable objects 110(1) to 110(n) of all types, and all models of movable objects 110(1) to 110(n) of the same type.

Further, in the terminal device [200(1), 200(2), 300] of the present embodiment, by storing in the storage unit 230, 330, pieces of model information MI associated with pieces of area information AR and updating software packages WFW associated with the pieces of model information MI received from the server 130, pieces of model information MI of the movable objects not related to the terminal device [200(1), 200(2), 300] can be excluded, and the data volume can be reduced by the amount excluded. With this, the volume of the storage unit 230, 330 to be taken can be reduced, and the communication time can be reduced.

Further, in each of the terminal devices 200(1), 200(2), 300 related to the present embodiment, the updating software packages WFW received from the server 130 and the pieces of update information RI of the updating software packages WFW such as version VR are stored in the storage unit [230, 330]. Therefore, whether or not the software package FW for the control device [113(1) to 113(m)] is the latest package can be recognized in advance. Hence, unnecessary transmission of updating software packages WFW to movable objects can be omitted.

Further, the terminal device [200(1), 200(2)] related to the first embodiment can update the software package FW of the control device [113(1) to 113(m)] mounted in the own movable object [110(1), 110(2)], based on the updating software package WFW stored in the storage unit 230 provided in the own movable object [110(1), 110(2)], in addition to rewriting of the software packages FW of control devices 113(1) to 113(m) mounted in other movable objects [110(2) to 110(n)], [110(1), 110(3) to 110(n)] based on updating software packages WFW by transmitting the updating software packages WFW stored in the storage unit 230 to the other movable objects [110(2) to 110(n)], [110(1), 110(3) to 110(n)], via its short-range wireless communication unit 240 and a short-range wireless communication network LN.

Further, the terminal device 300 related to the second embodiment functions as a multi-function portable communication terminal device, and its short-range wireless communication unit 340 performs communication with movable objects 110(1) to 110(n) via a short-range wireless communication network LN, and transmits updating software packages WFW stored in its storage unit 330 to the movable objects 110(1) to 110(n) via the short-range wireless communication unit 340 and the short-range wireless communication network LN. The terminal device 300 can be a publicly-available general-use terminal device; e.g., a multi-function portable communication terminal device such as a tablet computer, a smartphone. This way, the workability in rewriting software packages FW in the control devices 113(1) to 113(m) of the movable objects 110(1) to 110(n) can be improved.

In the above description, the terminal devices 200(1) and 200(2), out of the dedicated terminal devices 200(1) to 200(n), are each a terminal device that can serve as a distribution source. However, instead of or in addition to them, at least one of the other terminal device 200(3) to 200(n) may be a terminal device that can server as a distribution source. That is, at least one of the terminal devices 200(1) to 200(n) is a terminal device (distribution source) that can serve as a distribution source for other terminal devices, and all of the terminal devices may be a terminal device that can serve as a distribution source for the other terminal devices.

Regarding Other Embodiments

The software rewriting system 100 related to the above embodiment deal with a case of applying the same to agricultural traveling work machines such as combine harvesters, tillers, rice transplanters as the movable objects 110; however, application of the above-disclosed technology is not limited to them and is also applicable to construction travel work machines such as tractors, shovel cars, wheel loaders, and carriers, and to ships such as pleasure boat, fishing boat.

Further, in the above movable objects 110(1) to 110(n), a single control device 113 is provided for a single work unit 111; however, a plurality of control devices 113 may be provided for a single work unit 111.

The present invention is not limited to the embodiments described above, and can be implemented in various other forms. For that reason, such embodiments are merely illustrative in all respects, and should not be construed as limiting. The scope of the present invention is indicated by the scope of the claims, and is not bound in any way in the text of the above description. Furthermore, all variations and modifications falling within the equivalent scope of the claims are within the scope of the present invention.

This application claims priority based on Japanese Patent Application No. 2016-038927 filed on Mar. 1, 2016 in Japan. The entire contents of the application is hereby incorporated by reference.

INDUSTRIAL APPLICABILITY

The present invention relates to a terminal device and a software rewriting program for use in a software rewriting system for rewriting a software package of a control device mounted in a movable object, and is applicable for reliably rewriting a software package of a control device mounted in a movable object even in an area with underdeveloped communication infrastructure.

REFERENCE SIGNS LIST 100 software rewriting system
110 movable object
111 work unit
113 control device
120 remote monitoring center
130 server
131 control unit
131a processing unit
131b memory device
132 wide area communication unit
133 storage unit
200 dedicated terminal device
210 control unit
210a processing unit
210b memory device
220 wide area communication unit
230 storage unit
240 short-range wireless communication unit
250 signal communication unit
260 power source control unit
300 general-use terminal device
310 control unit
310a processing unit
310b memory device
320 wide area communication unit
330 storage unit
340 short-range wireless communication unit
350 user interface unit
AR area information
BT battery
CC control device code
DB updating software database
DB1 model information management database
DB2 updating software management database
DB3 updating software storing database
DB4 area information management database
FW software package of control device
ID terminal identification information
LN short-range wireless communication network
MC model code
MI model information
MT type of movable object
PP software rewriting program
Q1 reception control unit
Q2 storage control unit
Q3 transmission control unit
Q4 rewriting control unit
RI update information
SW start switch
VR version
WFW updating software package
WFWC updating software code
WN wide area network
Ss1 to Ss4 communication control step in server, with terminal device
St11 to St15 communication control step in terminal device, with server

The invention claimed is:

1. A terminal device for use in a software rewriting system configured to rewrite one or more software packages of one or more control devices coupled to one or more vehicles, the terminal device comprising:
 a wide area communication unit configured to communicate, via a wide area network, with a server having an updating software database configured to store one or more updating software packages for updating the one or more software packages of the one or more control devices;
 a storage unit;
 a short-range wireless communication unit configured to communicate with the one or more vehicles via a short-range wireless communication network;
 a processor; and
 a memory coupled to the processor and configured to store instructions that, when executed by the processor, cause the processor to:
  initiate transmission of terminal identification information of the terminal device to the server via the wide area communication unit and the wide area network, wherein the terminal identification information corresponds to area information indicative of one or more control areas of the terminal device, and wherein the one or more vehicles are within the one or more control areas;
  receive the one or more updating software packages from the server via the wide area communication network and the wide area network;
  store the one or more updating software packages received from the server at the storage unit; and
  initiate transmission of at least one of the one of more updating software packages from the storage unit to the one or more vehicles via the short-range communication unit and the short-range communication network.

2. The terminal device according to claim 1, wherein:
 the updating software database is configured to store the one or more updating software packages associated with one or more pieces of model information of the one or more vehicles;
 the one or more pieces of model information and the one or more updating software packages associated with the one or more pieces of model information in the updating software database are received from the server via the wide area network and the wide area communication unit;
 the one or more pieces of model information and the one or more updating software packages associated with the pieces of model information received from the server are stored in the storage unit;
 at least one piece of model information of at least one vehicle on at least one other end is specified from the one or more pieces of model information stored in the storage unit; and
 at least one updating software package corresponding to the at least one piece of model information of the at least one vehicle on the at least one other end, out of the one or more updating software packages stored in the storage unit, is transmitted to the at least one vehicle on the at least one other end via the short-range wireless communication unit and the short-range wireless communication network.

3. The terminal device according to claim 2, wherein:
the updating software database is configured to store, in association with terminal identification information of the terminal device, the area information indicative of the one or more control areas of the one or more vehicles;
at least one of the one or more pieces of model information corresponding to the area information associated with the terminal identification information of the terminal device and at least one of the one or more updating software packages associated with the at least one of the one or more pieces of model information in the updating software database are received from the server via the wide area network and the wide area communication unit; and
the at least one of the one or more pieces of model information corresponding to the area information and the at least one of the one or more updating software packages associated with the at least one of the one or more pieces of model information received from the server are stored in the storage unit.

4. The terminal device according to claim 1, wherein:
the updating software database is configured to store one or more pieces of update information of the one or more updating software packages,
the one or more updating software packages and the one or more pieces of update information of the one or more updating software packages in the updating software database are received from the server via the wide area network and the wide area communication unit, and
the one or more updating software packages and the one or more pieces of update information of the one or more updating software packages received from the server are stored in the storage unit.

5. The terminal device according to claim 1, wherein:
the terminal device is integrated in one of the one or more vehicles;
the short-range wireless communication unit is configured to communicate with at least one other of the one or more vehicles apart from the one of the one or more vehicles via the short-range wireless communication network; and
at least one of the one or more updating software packages stored in the storage unit is transmitted to the at least one other of the one or more vehicles via the short-range wireless communication unit and the short-range wireless communication network.

6. The terminal device according to claim 1, wherein:
the terminal device is configured to function as a multi-function portable communication terminal device;
the short-range wireless communication unit is configured to communicate with the one or more vehicles via the short-range wireless communication network, and
at least one of the one or more updating software packages stored in the storage unit is transmitted to the at least one of the one or more vehicles via the short-range wireless communication unit and the short-range wireless communication network.

7. A non-transitory, computer-readable storage device storing instructions that, when executed by a processor, cause the processor to perform operations comprising:
transmitting terminal identification information of a terminal device from the terminal device to a server via a wide area network, wherein the server is configured to store an updating software database storing an updating software package for updating a software package of a control, device coupled to a vehicle, wherein the terminal identification information corresponds to area information indicative of one or more control areas of the terminal device, and wherein the vehicle is within the one or more control areas;
receiving an updating software package in the updating software database from the server at the terminal device via the wide area network;
storing the updating software package received from the server in a storage unit of the terminal device; and
transmitting the updating software package stored in the storage unit from the terminal device to the vehicle via a short-range wireless communication network.

8. The non-transitory, computer-readable storage device of claim 7, wherein model information corresponding to the one or more vehicles corresponds to the area information, wherein the model information indicates vehicle types of the one or more vehicles, and wherein the one or more updating software packages correspond to the model information.

9. The non-transitory, computer-readable storage device of claim 7, wherein the terminal device is integrated in a vehicle.

10. The non-transitory, computer-readable storage device of claim 7, wherein the vehicle comprises a work vehicle or a ship.

11. A method comprising:
transmitting terminal identification information of a terminal device from the terminal device to a server via a wide area network, wherein the server is configured to store an updating software database storing updating software packages for updating one or more software packages of one or more control devices coupled to one or more vehicles, wherein the terminal identification information corresponds to area information indicative of one or more control areas of the terminal device, and wherein the one or more vehicles are within the one or more control areas;
receiving one or more updating software packages from the server at the terminal device via the wide area network;
storing the one or more updating software packages received from the server in a storage unit of the terminal device; and
transmitting the one or more updating software packages stored in the storage unit from the terminal device to the one or more vehicles via a short-range wireless communication network.

12. The method of claim 11, wherein model information corresponding to the one or more vehicles corresponds to the area information.

13. The method of claim 12, wherein the model information indicates vehicle types of the one or more vehicles, and wherein the one or more updating software packages correspond to the model information.

14. The method of claim 13, further comprising receiving, from the server at the terminal device via the wide area network, the model information.

15. The method of claim 11, further comprising:
transmitting, from the terminal device to one of the one or more vehicles, a version identifier of an updating software package of the one or more updating software packages; and
receiving an indication, at the terminal device from the one of the one or more vehicles, that the one of the one or more vehicles does not have the updating software package.

16. The method of claim 15, wherein the updating software package is transmitted to the one of the one or more vehicles based on the one of the one or more vehicles not having the updating software package.

17. The method of claim 11, further comprising:
receiving, from one of the one or more vehicles, a version identifier of a software package stored at the one of the one or more vehicles;
comparing the version identifier of the software package stored at the one of the one or more vehicles to a version identifier of an updating software package of the one or more updating software packages; and
transmitting, from the terminal device to the one of the one or more vehicles, the updating software package based on the version identifiers being different.

18. The method of claim 11, wherein the terminal device is integrated in a vehicle.

19. The method of claim 11, wherein the one or more vehicles comprise one or more work vehicles.

20. The method of claim 11, wherein the one or more vehicles comprise one or more ships.

* * * * *